(12) United States Patent
Gregorian et al.

(10) Patent No.: US 9,693,085 B2
(45) Date of Patent: *Jun. 27, 2017

(54) METHOD AND DISTRIBUTION CHANNEL FOR CREATING ANCILLARY REVENUE STREAMS FROM RELATED MEDIA CONTENT

(71) Applicant: Warner Bros. Entertainment, Inc., Burbank, CA (US)

(72) Inventors: Lisa Gregorian, Studio City, CA (US); Craig Hunegs, Santa Monica, CA (US)

(73) Assignee: WARNER BROS. ENTERTAINMENT INC., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/069,854

(22) Filed: Mar. 14, 2016

(65) Prior Publication Data
US 2016/0198206 A1   Jul. 7, 2016

Related U.S. Application Data

(63) Continuation of application No. 14/555,527, filed on Nov. 26, 2014, now Pat. No. 9,288,552, which is a
(Continued)

(51) Int. Cl.
*G06F 3/00* (2006.01)
*G06F 13/00* (2006.01)
(Continued)

(52) U.S. Cl.
CPC ......... *H04N 21/25875* (2013.01); *H04N 7/16* (2013.01); *H04N 21/21815* (2013.01); *H04N 21/2541* (2013.01); *H04N 21/2542* (2013.01); *H04N 21/25435* (2013.01); *H04N 21/2668* (2013.01); *H04N 21/4622* (2013.01); *H04N 21/478* (2013.01); *H04N 21/4722* (2013.01); *H04N 21/4782* (2013.01); *H04N 21/47815* (2013.01); *H04N 21/812* (2013.01); *H04N 21/8113* (2013.01); *H04N 21/8133* (2013.01); *H04N 21/8173* (2013.01); *H04N 21/854* (2013.01); *H04N 21/8586* (2013.01);
(Continued)

(58) Field of Classification Search
CPC ........... H04N 21/4722; H04N 21/8173; H04N 21/478; H04N 21/42204; H04N 21/4316; H04N 21/4622; H04N 21/25435

See application file for complete search history.

(56) References Cited

U.S. PATENT DOCUMENTS 6,184,877 B1   2/2001  Dodson et al.
6,928,262 B1   8/2005  Kanemitsu
(Continued)

*Primary Examiner* — Joshua Taylor
(74) *Attorney, Agent, or Firm* — Jonathon Jaech; Snell & Wilmer L.L.P.

(57) ABSTRACT

A method for creating revenue for content related to a broadcast program and a related subscription distribution channel and web page. The method includes providing a subscription distribution channel that is accessible by a user, obtaining the content related to the broadcast program, and making the content available to the user via the subscription distribution channel. The content may include an ancillary product or ancillary content that is related to and distinct from an episode of the broadcast program that has not yet been published.

20 Claims, 53 Drawing Sheets

Related U.S. Application Data continuation of application No. 11/260,064, filed on Oct. 26, 2005, now abandoned.

(60) Provisional application No. 60/622,266, filed on Oct. 26, 2004.

(51) Int. Cl.

| | |
|---|---|
| *H04N 5/445* | (2011.01) |
| *H04N 21/258* | (2011.01) |
| *H04N 7/16* | (2011.01) |
| *H04N 21/462* | (2011.01) |
| *H04N 21/4722* | (2011.01) |
| *H04N 21/478* | (2011.01) |
| *H04N 21/81* | (2011.01) |
| *H04N 21/854* | (2011.01) |
| *H04N 21/218* | (2011.01) |
| *H04N 21/2543* | (2011.01) |
| *H04N 21/4782* | (2011.01) |
| *H04N 21/254* | (2011.01) |
| *H04N 21/2668* | (2011.01) |
| *H04N 21/858* | (2011.01) |
| *H04N 21/422* | (2011.01) |
| *H04N 21/431* | (2011.01) |
| *H04N 21/47* | (2011.01) |

(52) U.S. Cl.
CPC ... *H04N 21/42204* (2013.01); *H04N 21/4316* (2013.01); *H04N 21/47* (2013.01)

(56) References Cited

U.S. PATENT DOCUMENTS

| | | |
|---|---|---|
| 7,080,392 B1 | 7/2006 | Geshwind |
| 7,308,420 B1 | 12/2007 | Storch et al. |
| 2002/0152278 A1 | 10/2002 | Pontenzone et al. |
| 2003/0056212 A1 | 3/2003 | Siegel et al. |
| 2003/0126605 A1 | 7/2003 | Betz et al. |
| 2003/0188314 A1 | 10/2003 | Ellis et al. |
| 2004/0109087 A1 | 6/2004 | Robinson et al. |
| 2004/0136698 A1 | 7/2004 | Mock |
| 2004/0181531 A1 | 9/2004 | Becker |
| 2004/0186779 A1 | 9/2004 | Yamamichi et al. |
| 2005/0229227 A1 | 10/2005 | Rogers |
| 2006/0101492 A1 | 5/2006 | Lowcock |
| 2006/0190320 A1 | 8/2006 | Dewa |
| 2006/0215988 A1 | 9/2006 | Tol et al. |
| 2007/0125620 A1 | 6/2007 | Sorenson et al. |

POOL HOUSE (SWEEPSTAKES-THANK YOU)
PAGE IS AVAIL TO MEMBERS ONLY.

| LINK: SHOW INFO PAGE | LINK: TO MUSIC PAGE | LINK: FASHION PAGE | LINK: BULLETIN BOARDS/CHAT PAGE | LINK: FREE DOWNLOADS PAGE | LINK: CAST PAGE | LINK: WIRELESS PAGE | LINK: OC SHOP |

TITLE HEADER, LOGO          SEARCH
WATCH IT: THURSDAYS AT 8/7C

BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING

LINK: TO POOL HOUSE → DOWNLOADS

"RUB ELBOWS WITH THE STARS" SWEEPSTAKES

THANK YOU! YOU'VE BEEN ENTERED INTO THE "RUB ELBOWS WITH THE STARS" SWEEPSTAKES

DON'T STOP NOW. LOOK AROUND AT ALL THE INSIDER STUFF YOU CAN GET RIGHT NOW BY BECOMING A MEMBER OF THEOCINSIDER.COM FOR $24.95 PER YEAR.

LINK: TO TRIVIA QUIZ → TEST YOUR KNOWLEDGE

- EXCLUSIVE QUARTERLY MAGAZINE
- BACKSTAGE PASS TO THE STARS AND INSIDE COMMENTARY
- TOO MANY FREE VIDEO, IMAGE AND OTHER DOWNLOADS TO MENTION
- ADVICE FROM THE OC STAFF
- DIRECT ACCESS TO THE STARS VIA BLOGS AND MESSAGE BOARDS
- EXCLUSIVE DISCOUNTS ON THEOCSTORE.COM MERCHANDISE
- EXCLUSIVE NEWSLETTER
- ACCESS TO LIMITED EDITION MEMBERS-ONLY MERCHANDISE AND SPECIAL OFFERS AND PROMOTIONS

— 66

LINK: TO STORE/ CLOTHING → IT'S GETTING COLD OUT THERE ON THE WATER. WARM UP WITH THE OC STOCKING CAP

JOIN NOW!

SIGN UP FOR EMAIL ALERTS! [EMAIL] SIGN UP FOR PHONE ALERTS! [WIRELESS NUMBER] TELL SOMEONE  HELP

TM & © WARNER BROS. ENTERTAINMENT INC. 2004. ALL RIGHTS RESERVED.
PRIVACY POLICY | TERMS OF USE

EMAIL SIGNUP

POPUP LINK: HTTP://
WWW2.WARNERBROS.COM/MAIN/CMP/
PRIVACY_URD.HTML

WIRELESS SIGNUP

FIG. 27

THE POOL HOUSE (TRIVIA)
PAGE IS MEMBERS ONLY.

| LINK: SHOW INFO PAGE | LINK: TO MUSIC PAGE | LINK: FASHION PAGE | LINK: BULLETIN BOARDS/CHAT PAGE | LINK: FREE DOWNLOADS PAGE | LINK: CAST PAGE | LINK: WIRELESS PAGE | LINK: OC SHOP |

TITLE HEADER, LOGO    SEARCH
WATCH IT: THURSDAYS AT 8/7C

BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING

LINK: TO SWEEPSTAKES — WANNA WIN SOME STUFF? ENTER TO WIN A TRIP TO THE OC SET AND MEET THE STARS!

TRIVIA
YEAH, YOU WATCH THE OC EVERY WEEK, NOW SHOW US YOU REALLY KNOW WHAT'S UP.

1. QUESTION
   ○ ANSWER 1
   ○ ANSWER 2
   ○ ANSWER 3
   ○ ANSWER 4
2. QUESTION
   ○ ANSWER 1
   ○ ANSWER 2
   ○ ANSWER 3
   ○ ANSWER 4
3. QUESTION
   ○ ANSWER 1
   ○ ANSWER 2
   ○ ANSWER 3
   ○ ANSWER 4
4. QUESTION
   ○ ANSWER 1
   ○ ANSWER 2
   ○ ANSWER 3
   ○ ANSWER 4
5. QUESTION
   ○ ANSWER 1
   ○ ANSWER 2
   ○ ANSWER 3
   ○ ANSWER 4

LINK: TO POOL HOUSE — DOWNLOADS

LINK: TO STORE/CLOTHING — IT'S GETTING COLD OUT THERE ON THE WATER. WARM UP WITH THE OC STOCKING CAP

— 36

SEND MY ANSWERS

SIGN UP FOR EMAIL ALERTS!  EMAIL  SIGN UP FOR PHONE ALERTS!  WIRELESS NUMBER  TELL SOMEONE  HELP
TM & © WARNER BROS. ENTERTAINMENT INC. 2004. ALL RIGHTS RESERVED.
PRIVACY POLICY | TERMS OF USE

EMAIL SIGNUP

POPUP LINK: HTTP://WWW2.WARNERBROS.COM/MAIN/CMP/PRIVACY_URD.HTML

WIRELESS SIGNUP

FIG. 28

THE POOL HOUSE (TRIVIA RESULTS)
PAGE IS MEMBERS ONLY.

LINK: SHOW INFO PAGE | LINK: TO MUSIC PAGE | LINK: FASHION PAGE | LINK: BULLETIN BOARDS/CHAT PAGE | LINK: FREE DOWNLOADS PAGE | LINK: CAST PAGE | LINK: WIRELESS PAGE | LINK: OC SHOP

TITLE HEADER, LOGO — SEARCH
WATCH IT: THURSDAYS AT 8/7C

BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING

TRIVIA
ANNA STERN WOULD BE PROUD. ALL YOUR ANSWERS ARE RIGHT ON.

LINK: TO SWEEPSTAKES — WANNA WIN SOME STUFF? ENTER TO WIN A TRIP TO THE OC SET AND MEET THE STARS!

1. QUESTION
   ○ THE CORRECT ANSWER IS 2
   TEXT GIVING MORE BACKGROUND ON THE QUESTION

2. QUESTION
   ○ THE CORRECT ANSWER IS 3
   TEXT GIVING MORE BACKGROUND ON THE QUESTION

LINK: TO POOL HOUSE — DOWNLOADS

3. QUESTION
   ○ THE CORRECT ANSWER IS 1
   TEXT GIVING MORE BACKGROUND ON THE QUESTION

LINK: TO STORE/CLOTHING — IT'S GETTING COLD OUT THERE ON THE WATER. WARM UP WITH THE OC STOCKING CAP

4. QUESTION
   ○ THE CORRECT ANSWER IS 3
   TEXT GIVING MORE BACKGROUND ON THE QUESTION

5. QUESTION
   ○ THE CORRECT ANSWER IS 4
   TEXT GIVING MORE BACKGROUND ON THE QUESTION

SIGN UP FOR EMAIL ALERTS! [EMAIL] SIGN UP FOR PHONE ALERTS! [WIRELESS NUMBER] TELL SOMEONE  HELP

TM & © WARNER BROS. ENTERTAINMENT INC. 2004. ALL RIGHTS RESERVED.
PRIVACY POLICY | TERMS OF USE

EMAIL SIGNUP
POPUP LINK: HTTP://WWW2.WARNERBROS.COM/MAIN/CMP/PRIVACY_URD.HTML
WIRELESS SIGNUP

FIG. 29

CAPTAIN OAT'S STABLE (COMMUNITY)
PAGE IS AVAIL TO NON-MEMBERS.

| LINK: SHOW INFO PAGE | LINK: TO MUSIC PAGE | LINK: FASHION PAGE | LINK: BULLETIN BOARDS/CHAT PAGE | LINK: FREE DOWNLOADS PAGE | LINK: CAST PAGE | LINK: WIRELESS PAGE | LINK: OC SHOP |

TITLE HEADER, LOGO — SEARCH
WATCH IT: THURSDAYS AT 8/7C

BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING

YOUR PROFILE

PLEASE CHOOSE A USERNAME AND PASSWORD AND FILL OUT YOUR SHIPPING INFORMATION BELOW. THIS IS THE FIRST STEP TO GETTING YOUR EXCLUSIVES FROM THEOCINSIDER.COM

WE'VE SUGGESTED A USERNAME, YOU MAY CHOOSE YOUR OWN, BUT IT MAY ALREADY BE TAKEN.

- FIRST NAME
- LAST NAME
- USERNAME (6-30 LETTERS/NUMBERS)
- PASSWORD (6-30 LETTERS/NUMBERS)
- RE-TYPE PASSWORD

- ADDRESS 1
- ADDRESS 2
- CITY
- STATE DROPDOWN
- COUNTRY
- POSTAL CODE
- PHONE NUMBER
- GENDER
- LANGUAGE

CONTINUE

BY CLICKING CONTINUE, I AGREE TO THESE TERMS & CONDITIONS. (LINK: TERMS & CONDITIONS)
STILL NOT GETTING WHAT YOU'RE ASKING FOR? CLICK HERE TO EMAIL US.(MAIL TO LINK: INFO@THEOCINSIDER.COM)

SIGN UP FOR EMAIL ALERTS! [EMAIL]   SIGN UP FOR PHONE ALERTS! [WIRELESS NUMBER]   TELL SOMEONE   HELP

TM & © WARNER BROS. ENTERTAINMENT INC. 2004 ALL RIGHTS RESERVED.
PRIVACY POLICY | TERMS OF USE

EMAIL SIGNUP

POPUP LINK: HTTP://WWW2.WARNERBROS.COM/MAIN/CMP/PRIVACY_URD.HTML

WIRELESS SIGNUP

POPUP LINK: HTTP://WWW2.WARNERBROS.COM/MAIN/CMP/TERMS_URD.HTML

REGISTRATION (CHOOSE PAYMENT METHOD)
PAGE IS AVAIL TO NON-MEMBERS.

LINK: SHOW INFO PAGE | LINK: TO MUSIC PAGE | LINK: FASHION PAGE | LINK: BULLETIN BOARDS/CHAT PAGE | LINK: CAST PAGE | LINK: WIRELESS PAGE | LINK: OC SHOP

SEARCH

TITLE HEADER, LOGO

BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING

WATCH IT: THURSDAYS AT 8/7C

HOW'RE YOU GOING TO PAY?

TELL US HOW YOU'D LIKE TO PAY FOR YOUR INSIDER PASS TO THE OC. YOU'LL GET IMMEDIATE ACCESS IF YOU USE PLASTIC. WE ALSO ACCEPT CHECKS AND MONEY ORDERS, BUT YOU JUST WON'T GET ANY FRESHNESS UNTIL WE CASH YOUR CHECK. IF YOU HAVE A GIFT CERTIFICATE, PLEASE ENTER THE CODE BELOW.

AMEX
MASTERCARD
VISA
DISCOVER
MONEY ORDER

PAYMENT METHODS DROPDOWN
GIFT CERTIFICATE
CONTINUE

BY CLICKING CONTINUE, I AGREE TO THESE TERMS & CONDITIONS.
(LINK: TERMS & CONDITIONS)

STILL NOT GETTING WHAT YOU'RE ASKING FOR? CLICK HERE TO EMAIL US.
(MAIL TO LINK: INFO@THEOCINSIDER.COM)

SIGN UP FOR EMAIL ALERTS! | EMAIL | SIGN UP FOR PHONE ALERTS! | WIRELESS NUMBER | TELL SOMEONE | HELP

WIRELESS SIGNUP

TM & © WARNER BROS. ENTERTAINMENT INC. 2004. ALL RIGHTS RESERVED.
PRIVACY POLICY | TERMS OF USE

POPUP LINK: HTTP://WWW2.WARNERBROS.COM/MAIN/CMP/PRIVACY_URD.HTML

POPUP LINK: HTTP://WWW2.WARNERBROS.COM/MAIN/CMP/TERMS_URD.HTML

EMAIL SIGNUP

REGISTRATION (CREDIT CARD PAYMENT)
PAGE IS AVAIL TO NON-MEMBERS.

- LINK: SHOW INFO PAGE
- LINK: TO MUSIC PAGE
- LINK: FASHION PAGE
- LINK: BULLETIN BOARDS/CHAT PAGE
- LINK: FREE DOWNLOADS PAGE
- LINK: CAST PAGE
- LINK: WIRELESS PAGE
- LINK: OC SHOP

TITLE HEADER, LOGO | SEARCH
WATCH IT: THURSDAYS AT 8/7C

BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING

PAY WITH PLASTIC
PLEASE PROVIDE YOUR CREDIT CARD AND BILLING ADDRESS INFORMATION BELOW. JUST COPY YOUR BILLING ADDRESS FROM YOUR CREDIT CARD STATEMENT.

| ITEM | QTY | NAME | DETAILS | PRICE | TOTAL |
|---|---|---|---|---|---|
| 531 | 1 | MEMBERSHIP US STANDARD | | $25.00 | $25.00 |

CREDIT CARD IMAGE WITH CVV2 NUMBER

- CREDIT CARD TYPE DROPDOWN
- CREDIT CARD NUMBER
- CVV2 NUMBER (SEE EXAMPLE)
- CVV2 OPTIONS
  - O # IS PRESENT
  - O # IS UNREADABLE
  - O # IS NOT PRESENT

SUB TOTAL: $25.00
SHIPPING AND HANDLING: $0.00
TOTAL AMOUNT: $25.00
CREDIT CARD PAYMENT AMOUNT: $25.00

CHECK TO MARK BILLING ADDRESS AS SAME AS SHIPPING ADDRESS

- BILLING ADDRESS 1
- BILLING ADDRESS 2
- BILLING CITY
- BILLING STATE DROPDOWN
- BILLING COUNTRY
- BILLING POSTAL CODE
- PHONE NUMBER

CONTINUE

BY CLICKING CONTINUE, I AGREE TO THESE TERMS & CONDITIONS. (LINK: TERMS & CONDITIONS)
STILL NOT GETTING WHAT YOU'RE ASKING FOR? CLICK HERE TO EMAIL US. (MAIL TO LINK: INFO@THEOCINSIDER.COM)

SIGN UP FOR EMAIL ALERTS! [EMAIL] SIGN UP FOR PHONE ALERTS! [WIRELESS NUMBER] TELL SOMEONE  HELP

TM & © WARNER BROS. ENTERTAINMENT INC. 2004. ALL RIGHTS RESERVED.
PRIVACY POLICY | TERMS OF USE

- EMAIL SIGNUP
- POPUP LINK: HTTP://WWW2.WARNERBROS.COM/MAIN/CMP/PRIVACY_URD.HTML
- WIRELESS SIGNUP
- POPUP LINK: HTTP://WWW2.WARNERBROS.COM/MAIN/CMP/TERMS_URD.HTML

REGISTRATION (CONFIRMATION)
PAGE IS AVAIL TO NON-MEMBERS.

- LINK: SHOW INFO PAGE
- LINK: TO MUSIC PAGE
- LINK: FASHION PAGE
- LINK: BULLETIN BOARDS/CHAT PAGE
- LINK: FREE DOWNLOADS PAGE
- LINK: CAST PAGE
- LINK: WIRELESS PAGE
- LINK: OC SHOP

TITLE HEADER, LOGO — SEARCH
WATCH IT: THURSDAYS AT 8/7C

| BACKSTAGE PASS | THE OC BAIT SHOP | FASHION & STYLE | CAPTAIN OATS' STABLE | THE POOL HOUSE | UP CLOSE AND PERSONAL | THE 949 | SHOPPING |

YOU'RE IN.
IF YOU PAID WITH PLASTIC, YOU CAN ACCESS ALL FRESH INFORMATION RIGHT AWAY. IF YOU PAID WITH A CHECK OR MONEY ORDER, YOU WILL GET AN EMAIL CONFIRMING YOUR MEMBERSHIP PRIVILEGES SHORTLY.
INLCUDED IN YOUR MEMBERSHIP:

- EXCLUSIVE QUARTERLY MAGAZINE
- BACKSTAGE PASS TO THE STARS AND INSIDE COMMENTARY
- TOO MANY FREE VIDEO, IMAGE AND OTHER DOWNLOADS TO MENTION
- ADVICE FROM THE OC STAFF
- DIRECT ACCESS TO THE STARS VIA BLOGS AND MESSAGE BOARDS
- EXCLUSIVE DISCOUNTS ON THEOCSTORE.COM MERCHANDISE
- EXCLUSIVE NEWSLETTER
- ACCESS TO LIMITED EDITION MEMBERS-ONLY MERCHANDISE AND SPECIAL OFFERS AND PROMOTIONS

FOR SUPPORT, PLEASE EMAIL ORDERS@THEOCINSIDER.COM OR FAX 000-000-0000. PLEASE BE SURE TO INCLUDE YOUR MEMBER AND ORDER NUMBER WHEN YOU CONTACT US.

CLICK HERE TO PRINT YOUR THEOCINSIDER.COM MEMBERSHIP ****

ORDER NO: 121247   MEMBER NO: 021753   ORDER DATE: AUG 9 2004 10:42AM
MEMBERSHIP ORDER: NEW MEMBER

SHIP TO:
**** *********
888 7TH AVE
NEW YORK, NV 10106
UNITED STATES

SHIPPED FROM:
THE OCINSIDER.COM
STREET ADDRESS
CITY, STATE, POSTAL CODE
FAX: 000-000-0000
EMAIL: ORDERS@THEOCINSIDER.COM
WEB: HTTP://WWW.THEOCINSIDER.COM

SHIPPED VIA: STANDARD SHIPPING

| ITEM | QTY | NAME | DETAILS | PRICE | TOTAL |
|---|---|---|---|---|---|
| 531 | 1 | MEMBERSHIP US STANDARD | | $25.00 | $25.00 |

SUB TOTAL: $25.00
SHIPPING AND HANDLING: $0.00
GIFT CERTIFICATES: -$5.00
TOTAL AMOUNT: $20.00
CREDIT CARD PAYMENT AMOUNT: $20.00

SIGN UP FOR EMAIL ALERTS! [EMAIL]   SIGN UP FOR PHONE ALERTS! [WIRELESS NUMBER]   TELL SOMEONE   HELP

TM & © WARNER BROS. ENTERTAINMENT INC. 2004. ALL RIGHTS RESERVED.
PRIVACY POLICY | TERMS OF USE

- EMAIL SIGNUP
- POPUP LINK: HTTP://WWW2.WARNERBROS.COM/MAIN/CMP/PRIVACY_URD.HTML
- WIRELESS SIGNUP
- POPUP LINK: HTTP://WWW2.WARNERBROS.COM/MAIN/CMP/TERMS_URD.HTML

FIG. 47

REGISTRATION (UNDERAGE REGISTRANT)
PAGE IS AVAIL TO NON-MEMBERS.
IF USER ENTERS A DATE OF BIRTH THAT MAKES HIM/HER 13 YEARS OR YOUNGER, S/HE IS SENT TO THE UNDERAGE PAGE TO GET A PARENT'S APPROVAL OF THEIR REGISTRATION.

| LINK: SHOW INFO PAGE | LINK: TO MUSIC PAGE | THE OC BAIT SHOP | LINK: FASHION PAGE | FASHION & STYLE | LINK: BULLETIN BOARDS/CHAT PAGE | CAPTAIN OATS' STABLE | LINK: FREE DOWNLOADS PAGE | LINK: CAST PAGE | THE POOL HOUSE | LINK: WIRELESS PAGE | UP CLOSE AND PERSONAL | LINK: OC SHOP |

TITLE HEADER, LOGO

SEARCH

WATCH IT: THURSDAYS AT 8/7C    THE 949    SHOPPING

BACKSTAGE PASS

YOU'RE A LITTLE YOUNG, AREN'T YOU?
WE KNOW YOU'RE MATURE FOR YOU AGE, BUT WE STILL HAVE TO MAKE SURE YOUR PARENTS ARE OK WITH YOU LOOKING AT OUR EXCLUSIVE STUFF. PLEASE ENTER YOUR PARENT'S EMAIL ADDRESS BELOW AND WE'LL SEND YOUR PARENT AN EMAIL TO FINISH YOUR REGISTRATION.

YOUR PARENT'S EMAIL ADDRESS.

ONE MORE TIME. RE-ENTER YOUR PARENT'S EMAIL ADDRESS

SEND REQUEST     CLEAR FORM

SIGN UP FOR EMAIL ALERTS!  EMAIL  SIGN UP FOR PHONE ALERTS!  WIRELESS NUMBER  TELL SOMEONE  HELP

WIRELESS SIGNUP

TM & © WARNER BROS. ENTERTAINMENT INC. 2004. ALL RIGHTS RESERVED.
PRIVACY POLICY | TERMS OF USE

POPUP LINK: HTTP://WWW2.WARNERBROS.COM/MAIN/CMP/PRIVACY_URD.HTML

POPUP LINK: HTTP://WWW2.WARNERBROS.COM/MAIN/CMP/TERMS_URD.HTML

EMAIL SIGNUP

REGISTRATION (ALREADY A MEMBER)
PAGE IS AVAIL TO NON-MEMBERS.

LINK: SHOW INFO PAGE | LINK: TO MUSIC PAGE | LINK: FASHION PAGE | LINK: BULLETIN BOARDS/CHAT PAGE | LINK: FREE DOWNLOADS PAGE | LINK: CAST PAGE | LINK: WIRELESS PAGE | LINK: OC SHOP

TITLE HEADER, LOGO

SEARCH

BACKSTAGE PASS | THE OC BAIT SHOP | FASHION & STYLE | CAPTAIN OATS STABLE | THE POLL HOUSE | UP CLOSE AND PERSONAL | THE 949 | SHOPPING

WATCH IT: THURSDAYS AT 8/7C

JOIN THE FUN. ALL-FRESH, ALL-NEW, ALL-DAY, ALL-NIGHT EXCLUSIVE PERKS.
WELCOME BACK, BITCH. YOU'RE ALREADY A MEMBER. SO JUST SIGN IN ALREADY.
DON'T REMEMBER THE TIDBITS OF INFORMATION ASKED FOR BELOW? CLICK HERE TO GET IT BACK.
(LINK: RETRIEVE LOGON INFO)

LOGON
PASSWORD

OPT-IN TO REMEMBER LOGON FOR THIS COMPUTER
LOGIN TO THEOCINSIDER.COM

STILL NOT GETTING WHAT YOU'RE ASKING FOR? CLICK HERE TO EMAIL US. (MAIL TO LINK: INFO@THEOCINSIDER.COM)

SIGN UP FOR EMAIL ALERTS! | EMAIL | SIGN UP FOR PHONE ALERTS! | WIRELESS NUMBER | TELL SOMEONE | HELP

TM & © WARNER BROS. ENTERTAINMENT INC. 2004. ALL RIGHTS RESERVED.
PRIVACY POLICY | TERMS OF USE

WIRELESS SIGNUP

POPUP LINK: HTTP://
WWW2.WARNERBROS.COM/MAIN/CMP/
PRIVACY_URD.HTML

POPUP LINK: HTTP://
WWW2.WARNERBROS.COM/MAIN/CMP/
TERMS_URD.HTML

EMAIL SIGNUP

FIG. 51

CAPTAIN OAT'S STABLE (COMMUNITY)
PAGE IS AVAIL TO MEMBERS ONLY.
THIS IS THE BRIDGE PAGE FOR USERS WHO ARE NOT LOGGED IN AND TRY TO CLICK ON A MEMBERS-ONLY SECTION OF THE SITE. THIS PAGE ASKS THE USER TO LOGIN (IF A MEMBER) OR TO JOIN THE SITE TO ACCESS MEMBERS ONLY CONTENT. IF USER ENTERS A DATE OF BIRTH THAT MAKES HIM/HER UNDER 13, THEY ARE SENT TO THE UNDERAGE ENTRANT PAGE

FIG. 52

METHOD AND DISTRIBUTION CHANNEL FOR CREATING ANCILLARY REVENUE STREAMS FROM RELATED MEDIA CONTENT

CROSS-REFERENCE TO RELATED APPLICATIONS

This application is a continuation of U.S. patent application Ser. No. 14/555,527 filed Nov. 26, 2014, now U.S. Pat. No. 9,288,552 issued Mar. 15, 2016, which is a continuation of U.S. patent application Ser. No. 11/260,064, filed Oct. 26, 2005, now abandoned, which claims priority under 35 U.S.C. §119(e) to U.S. Provisional Patent Application No. 60/622,266, filed on Oct. 26, 2004, which applications are incorporated by reference herein.

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD

The application relates generally to the field of producing additional sources of revenue through related media content. More specifically, the application relates to a method and a distribution channel for creating ancillary revenue streams from new media content, services, and products that are related to other media content.

BACKGROUND

Currently, most of the revenue created by various types of media content comes primarily from sales of the content itself and sometimes from sales of items associated with the delivered content. Often, the ancillary revenue from items associated with the content is not maximized, and comprises only a small portion of the total revenue that comes from the content. This occurs, in part, because those who would purchase items associated with the content do not view those items when they are most likely to purchase them. Additionally, at certain times, viewers of the content desire, and would purchase, additional or special content that is not available to them at that time.

The present application describes methods, systems and apparatus for overcoming these and other limitations of the prior art, and provides other related advantages.

SUMMARY

Embodiments of the present disclosure include a method and a distribution channel for creating and maximizing ancillary revenue streams from new media content, services, and products that are related to other media content. The method and the distribution channel provide numerous advantages, some of which include, creating additional or ancillary revenue streams by providing related media content that viewers desire; providing specific content, products, and services to viewers at a time then they most desire it; providing content in a form that is desirable to the viewer and that can be purchased easily; providing products, services, and content that create ancillary revenue streams with other products, services, and/or content that does not create ancillary revenue streams; providing additional or special content to the viewer for purchase, downloading, and/or viewing prior to the dissemination of related content the viewer is interested in.

For example, a method for creating revenue for content related to a broadcast program includes providing a subscription distribution channel that is accessible to a user, obtaining the content related to the broadcast program, and making the content available to the user via the subscription distribution channel.

The method further includes creating the content during a production of the broadcast program. Also, the method may further include making the content available for purchase by the user via the subscription distribution channel. The content may be packaged in a form selected from the group consisting of a DVD, a videotape, a streaming video, a CD-ROM, and a download. In addition, the content may be made available to the user via the subscription distribution channel approximately contemporaneous with an airing of the broadcast program.

In other, more detailed aspects, the subscription distribution channel is an Internet website. The method can further include providing a user interface, displaying a web page associated with the Internet website on the user interface, and displaying a link on the user interface that the user can select to initiate the purchase of the content.

In other, more detailed aspects, the content is selected from the group consisting of an episode of the broadcast program, a season of the broadcast program, an additional video sequence, a piece of behind the scene footage, a video journal for a character on the broadcast program, an exclusive clip, a cast interview, a teaser regarding a future episode of the broadcast program, a game, a wireless content, a magazine, a copy of a script, a character playlist, a photograph, a novelization of the broadcast program, a scrapbook, a greeting card, a comic book, a piece of merchandise that has been autographed by an individual affiliated with the broadcast program, a screensaver, an alert, a sweepstakes, a giveaway, an article, prop, or piece of apparel used by an actor or actress on the broadcast program, and a duplicate of the article, prop, or piece of apparel used by the actor or actress on the broadcast program. The wireless content may be selected from the group consisting of a ring tone, a wallpaper, a photo, and a video clip. Also, the article may be selected from the group consisting of a piece of jewelry, an accessory, and a watch.

In other, more detailed aspects, the content is a piece of music selected from the group consisting of an entire song and a portion of the song that is included in the broadcast program. The subscription distribution channel is coupled to a database that includes information related to the piece of music selected from the group consisting of a name of the song, a name of an album that includes the song, a name of an artist that performs the song, a profile of the artist, a release date for the artist, a concert date for the artist, and a name of an episode of the broadcast program that includes the song. The database is configured to be searched in response to a request from the user.

In other, more detailed aspects, the subscription distribution channel is an Internet website, and the method further includes providing the user with a user interface, and displaying a web page associated with the Internet website on the user interface. Also, the method can further include displaying a link on the web page that the user can select to initiate the purchase of the piece of music or a music video associated with the piece of music. In addition, the method can further include displaying the concert date for the artist on the web page based on the proximity of the location of a concert to the user. Furthermore, the method can include displaying a link on the web page that a user can select to initiate the purchase of a ticket to a concert to be performed by the artist.

Embodiments of the present disclosure include a subscription distribution channel that includes an Internet website that is accessible to a user via a user interface and a web page that is associated with the Internet website. The user interface is configured to display the web page, and the web page is configured to make content related to a broadcast program available to the user.

Another example is a web page associated with an Internet website and configured to be displayed to a user on a user interface. The web page is associated with a broadcast program and includes a link that the user can select to initiate the purchase of content related to the broadcast program.

Other features of the disclosure should become apparent from the following description of the preferred embodiments taken in conjunction with the accompanying drawings, which illustrate, by way of example, the inventive principles described herein.

BRIEF DESCRIPTION OF THE DRAWINGS

FIGS. 2-52 are schematic representations of Internet web pages that are associated with the Internet website of FIG. 1 and that implement one or more particular embodiments of the disclosure.

DETAILED DESCRIPTION

One particular embodiment of the disclosure, for example, involves a method of creating ancillary revenue streams in connection with broadcast television programming by (1) creating related media content during physical production of episodes of one or more television programs, (2) packaging the related media content into a form in which it can be sold, (3) making the related media content available for purchase, download, or viewing prior to the actual airing of the television program ("show"). This method, in addition to creating ancillary revenue streams, creates a show-based, lifestyle brand that is identifiable by consumers.

Figure 1:
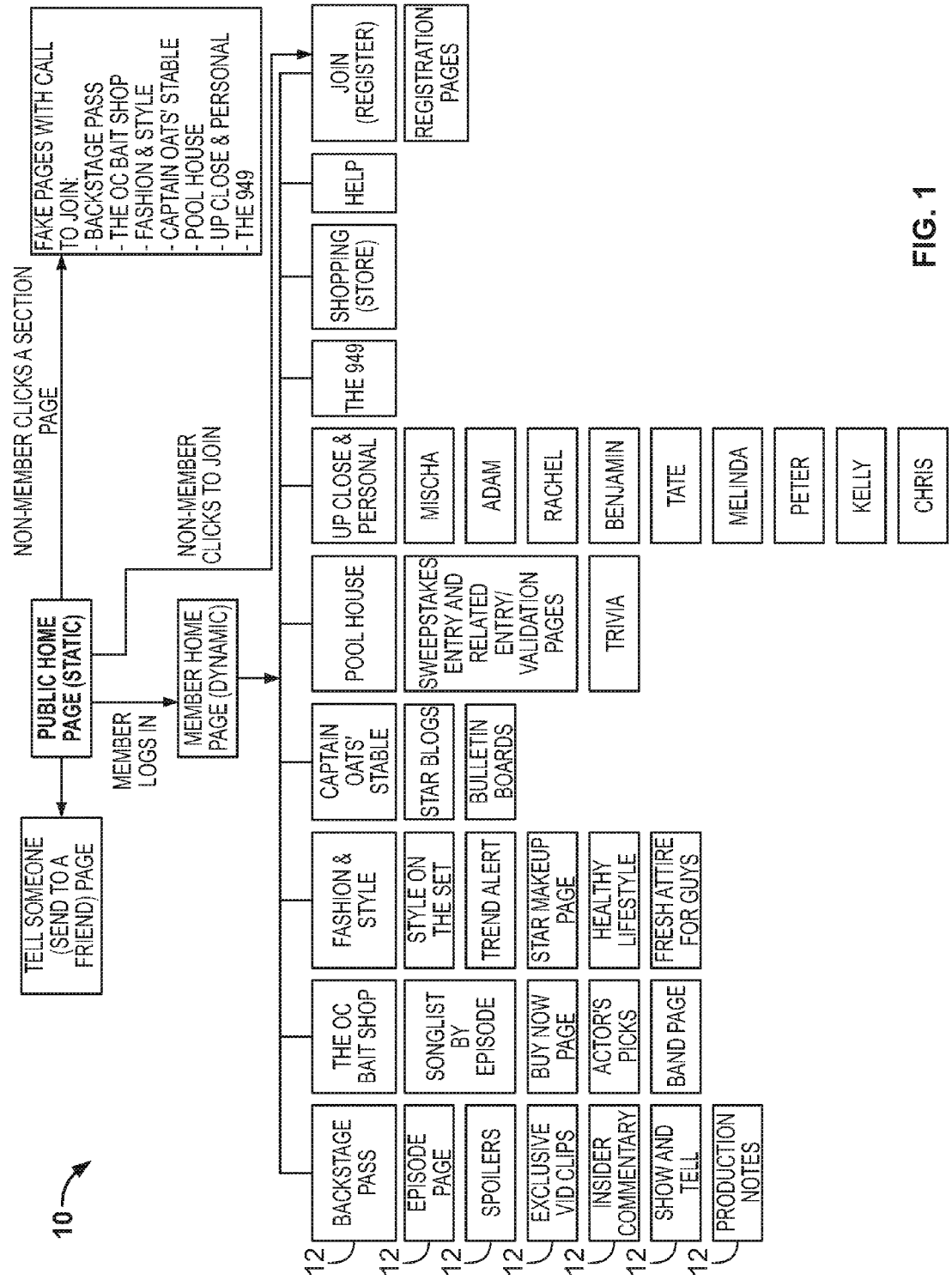
FIG. 1 is a schematic representation of the structure of an Internet website used to implement one particular embodiment of the disclosure.
Figure 2:
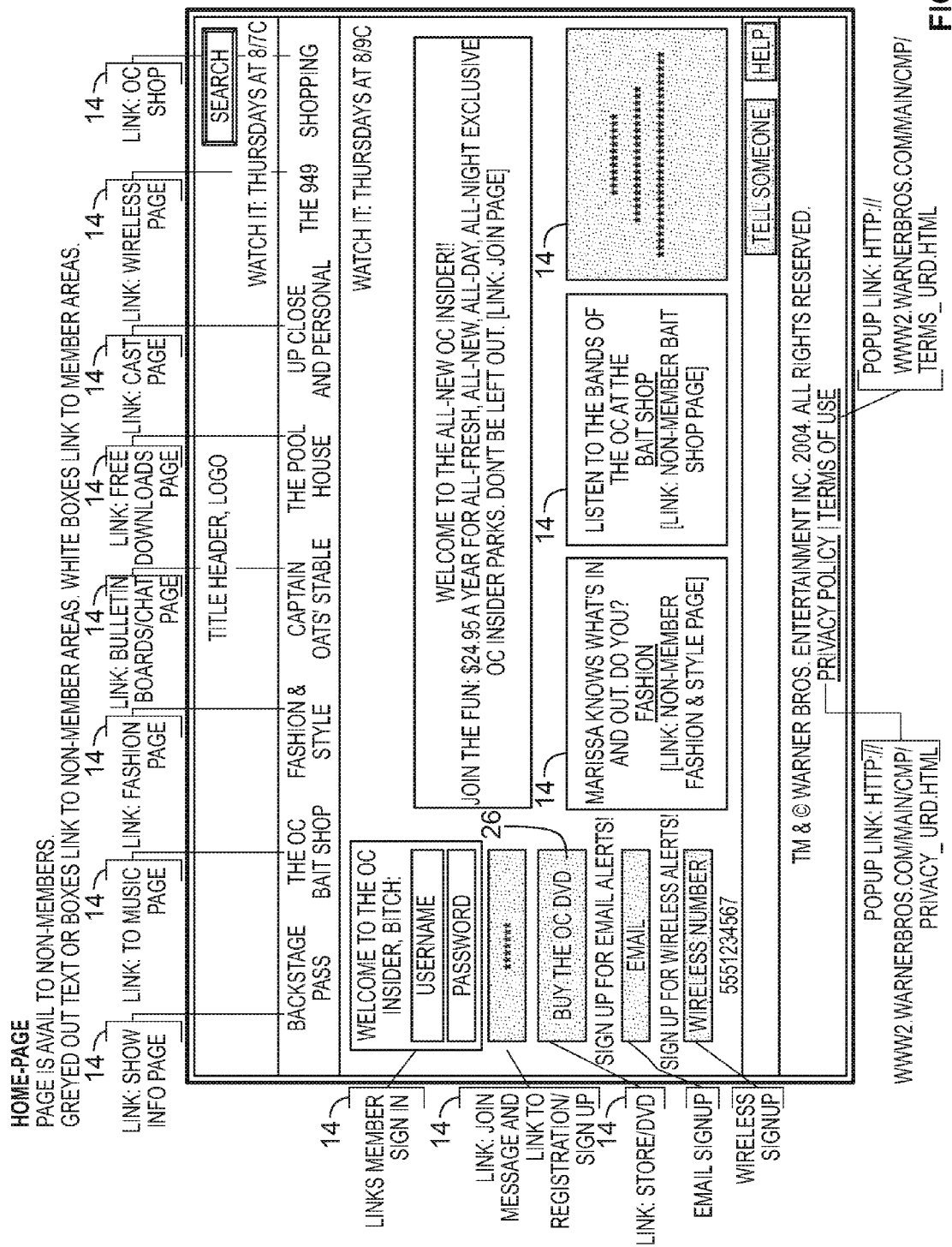
Figure 53:
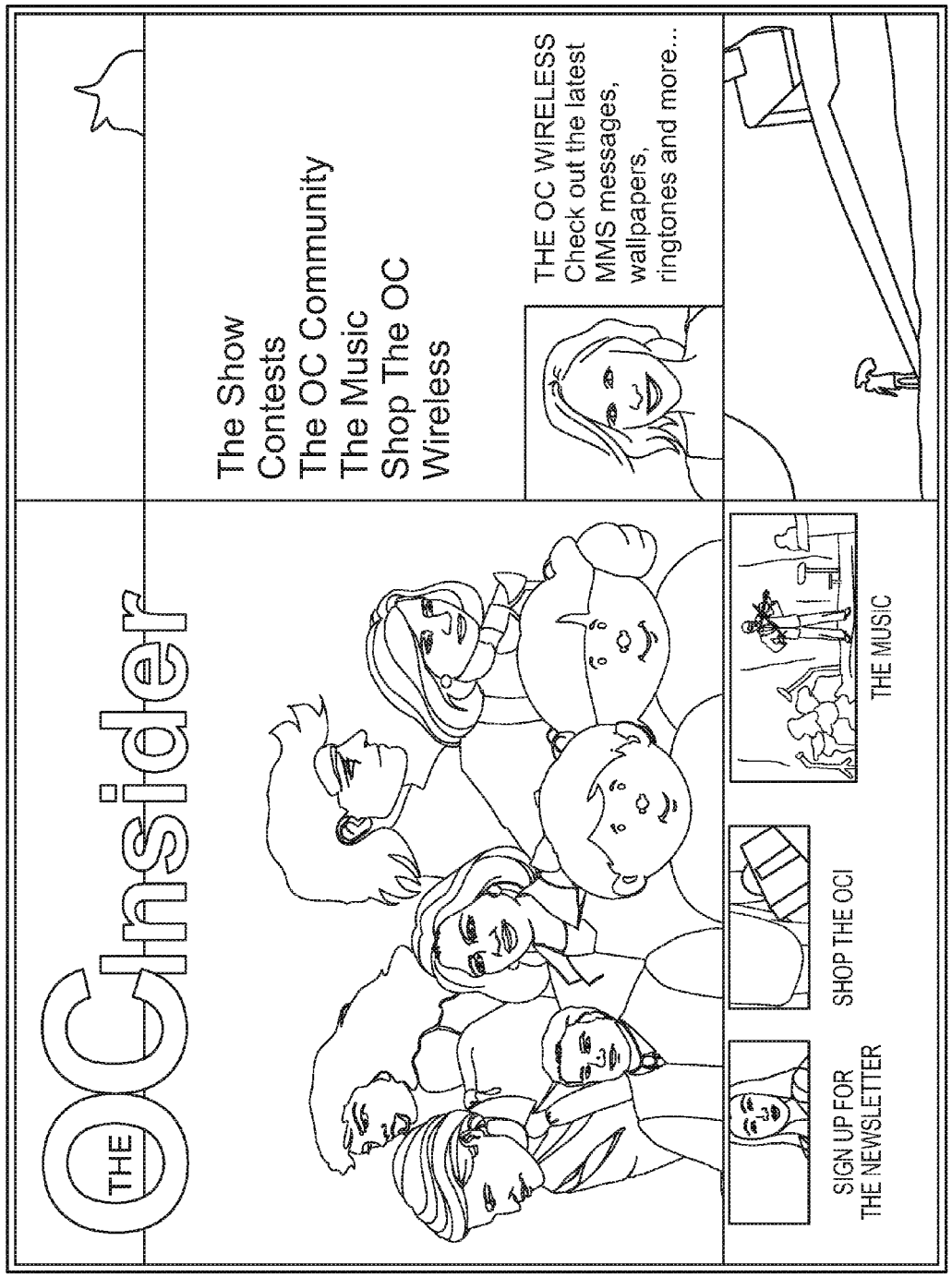
FIG. 53 is a representation of an Internet web home page that implements one or more embodiments of the disclosure.

FIG. 1 is a block diagram of the structure of an Internet website 10 according to an embodiment, which can be used to obtain related media content for a television show. The block diagram includes the names of the web pages 12 that are associated with the Internet website and that can be displayed for a user on a user interface, e.g., a computer or a cellular phone. FIGS. 2-53 are schematic representations of web pages associated with the embodiment illustrated in FIG. 1. The web pages can contain links 14 (see FIG. 2) to other web pages, which are selectable by the user.

Figure 3:
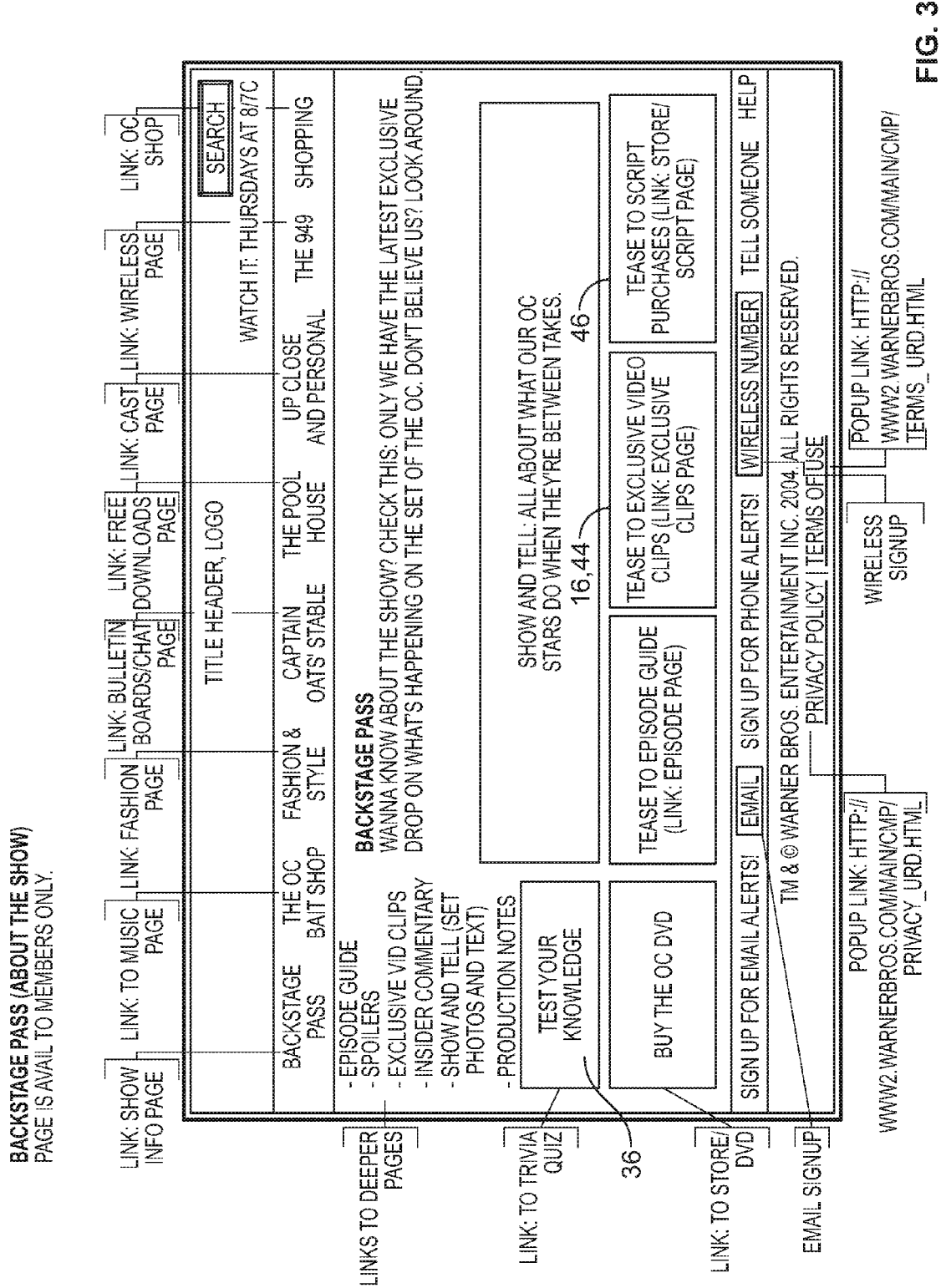
Figure 6:
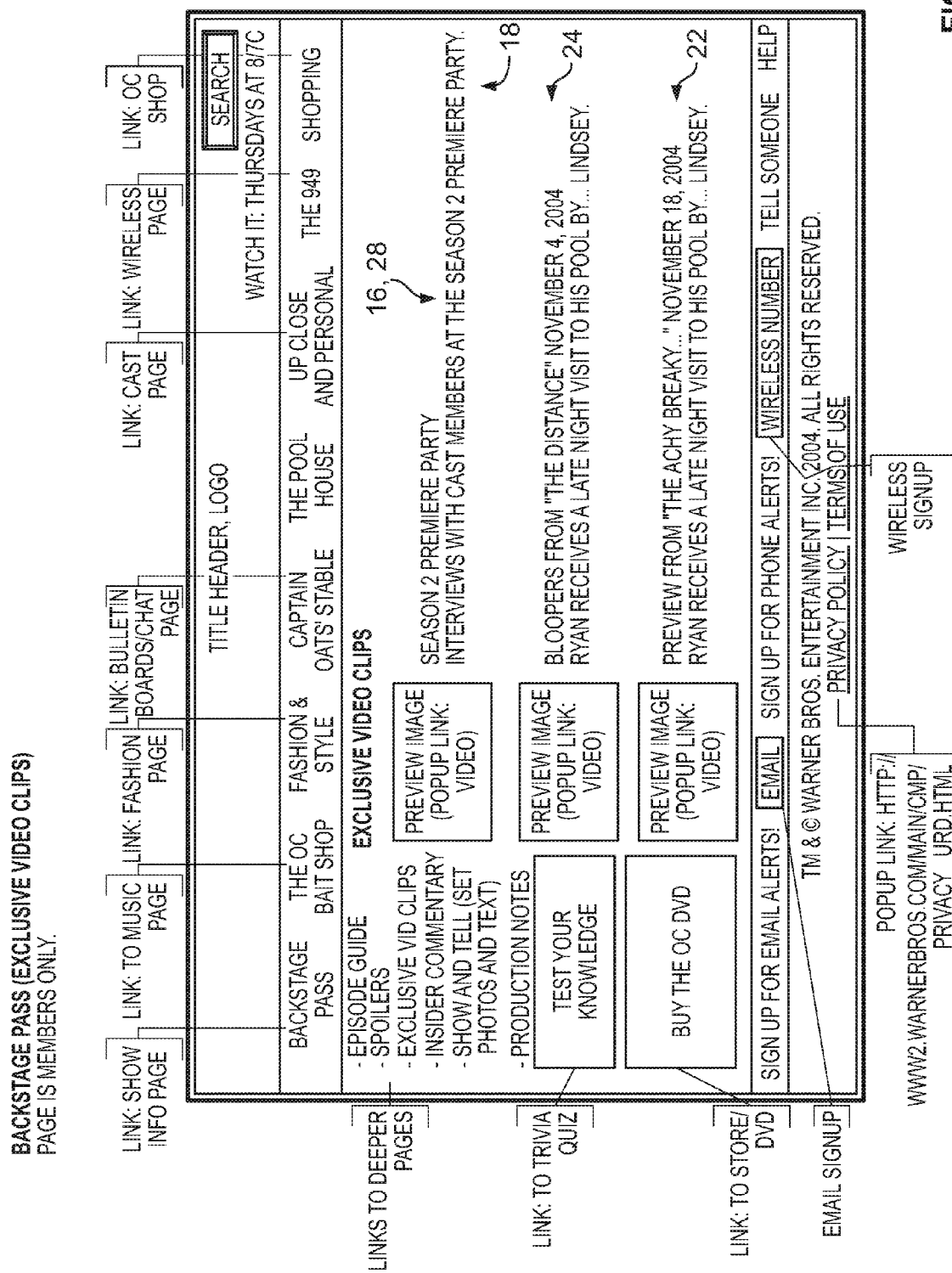
Figure 7:
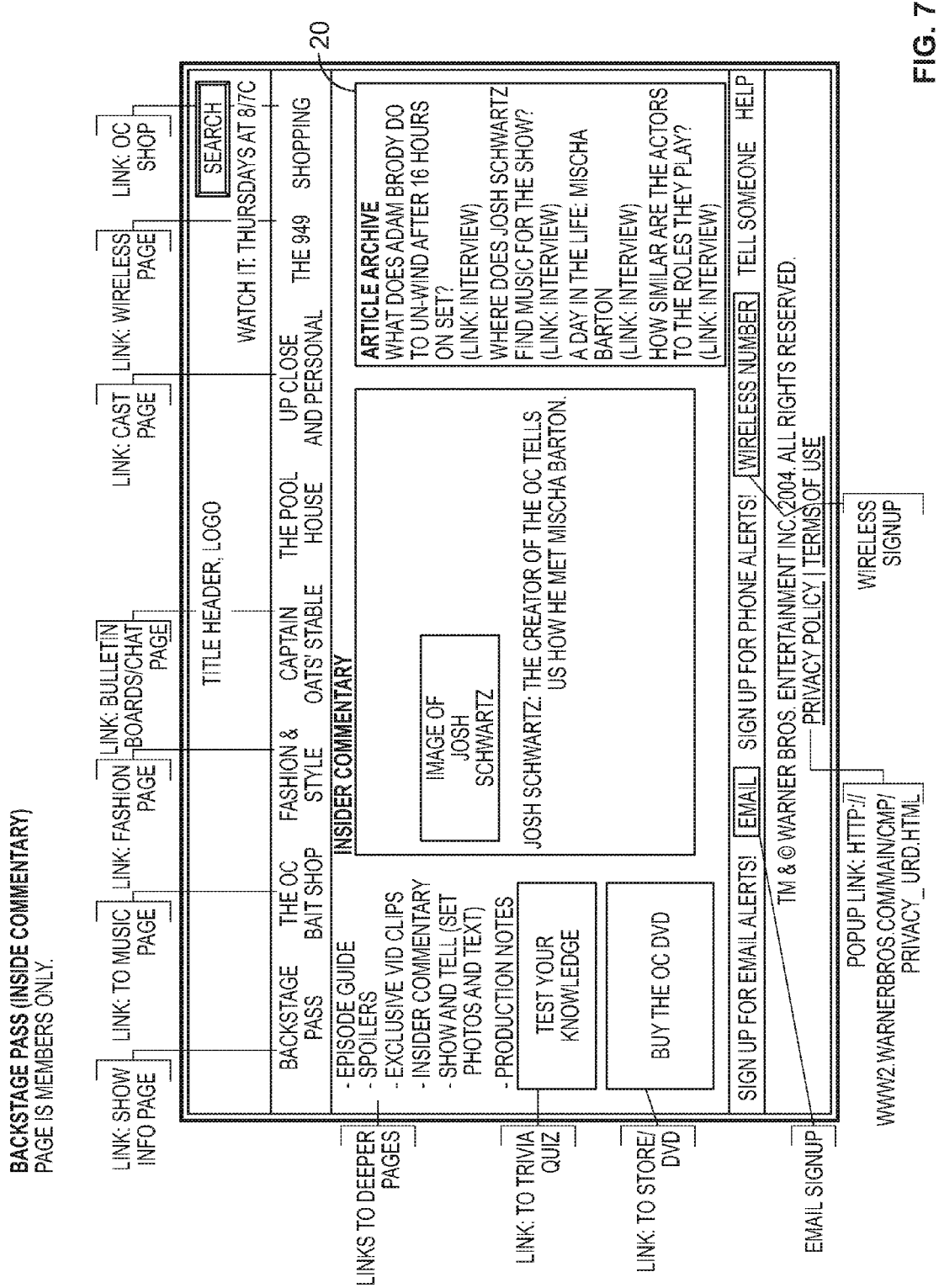

In embodiment of the present invention, the related media content can be any type of content inspired by the show, including, but not limited to, additional video sequences 16 (see FIGS. 3 and 6), behind the scenes footage 18 (see FIG. 6), cast interviews and commentary 20 (see FIG. 7), teasers regarding future episodes 22 (see FIG. 6), and other content that the viewer, user, or other potential customer would like to see. In another particular embodiment of the present invention, the related media content relates to a specific episode of a television program 24. Typically, regular viewers of the television program would be very interested in receiving such information in advance of the airing of the actual television program, particularly if such information is not generally available to the public.

Figure 12:
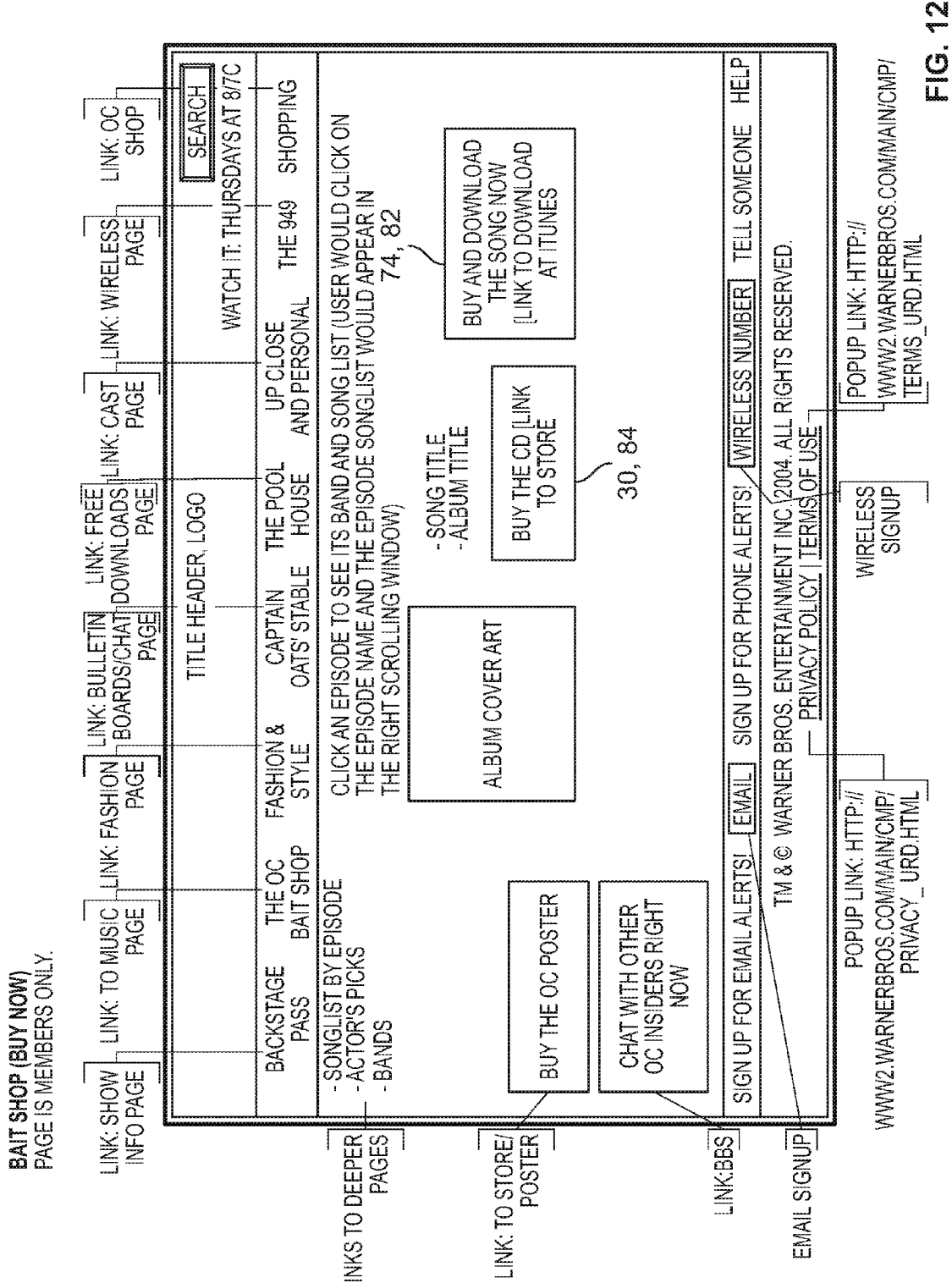
Figure 13:
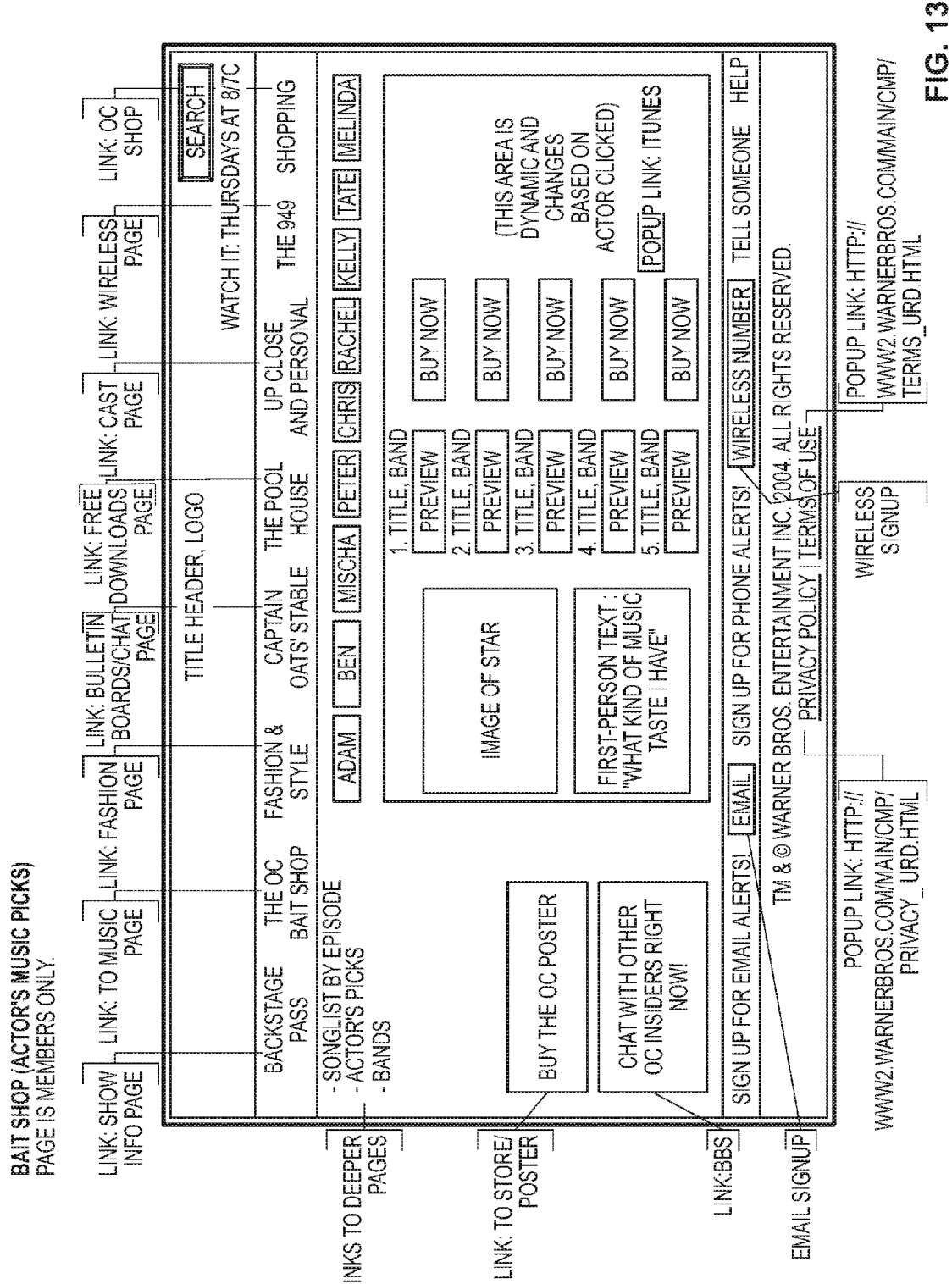
Figure 14:
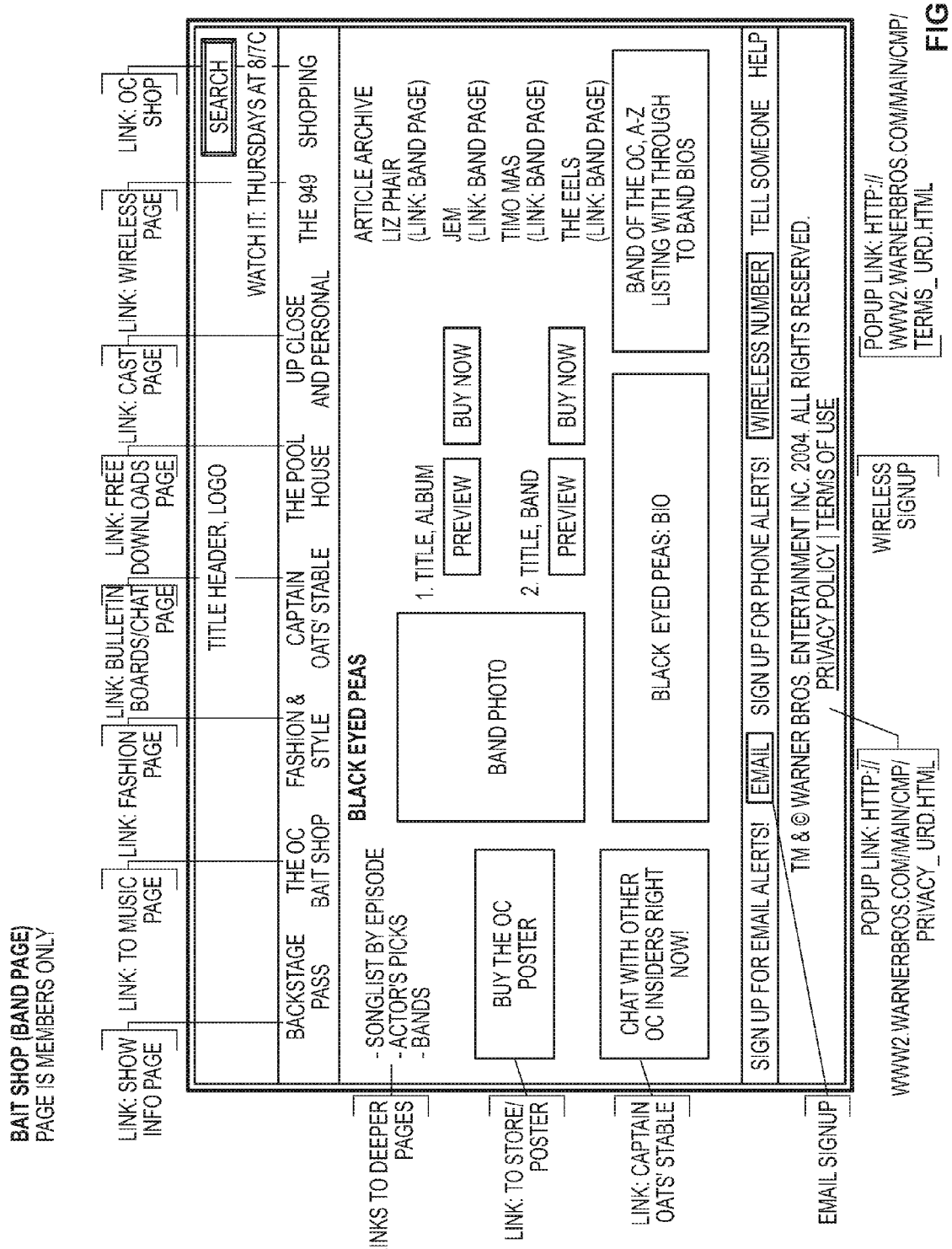
Figure 15:
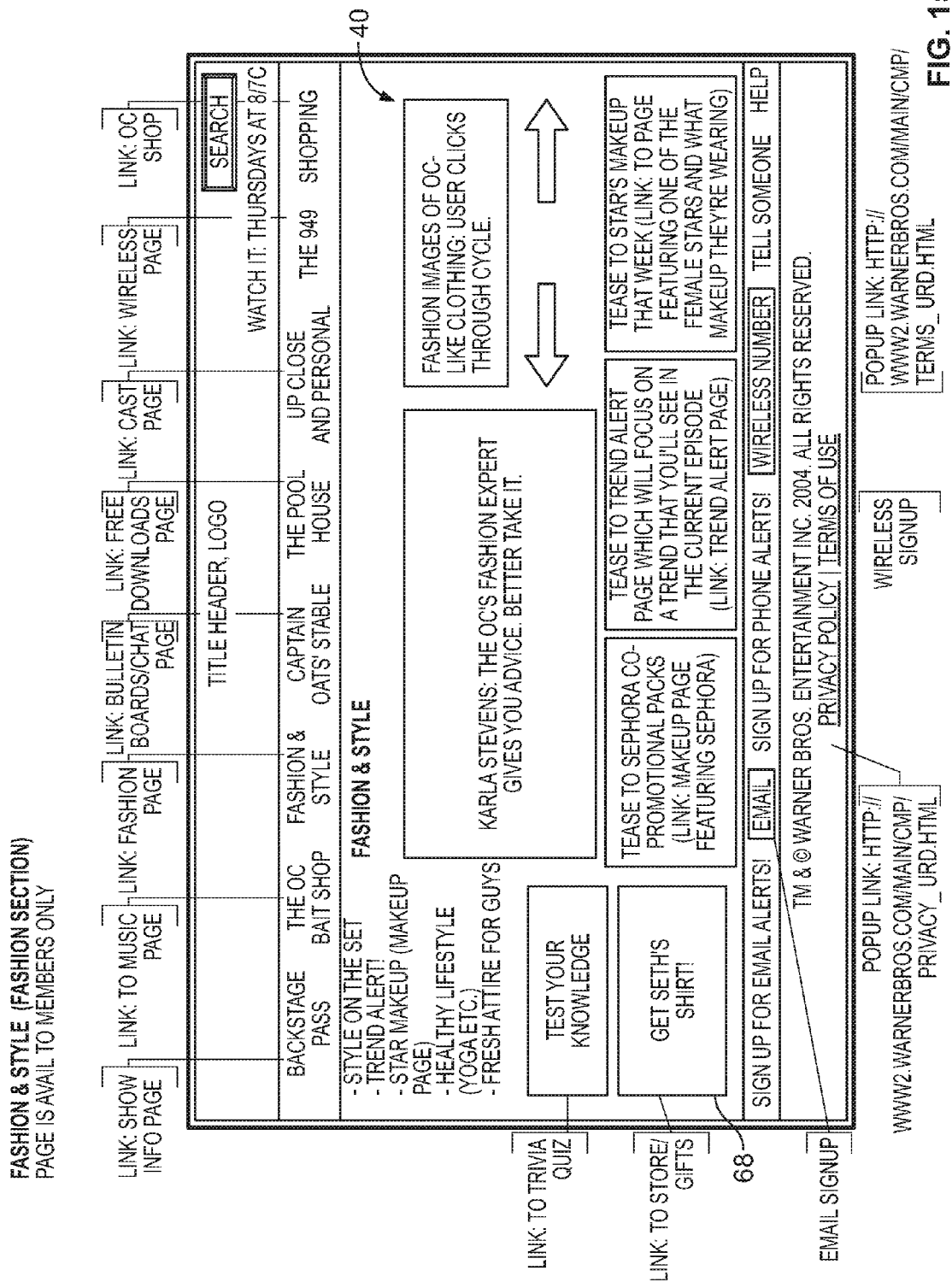
Figure 16:
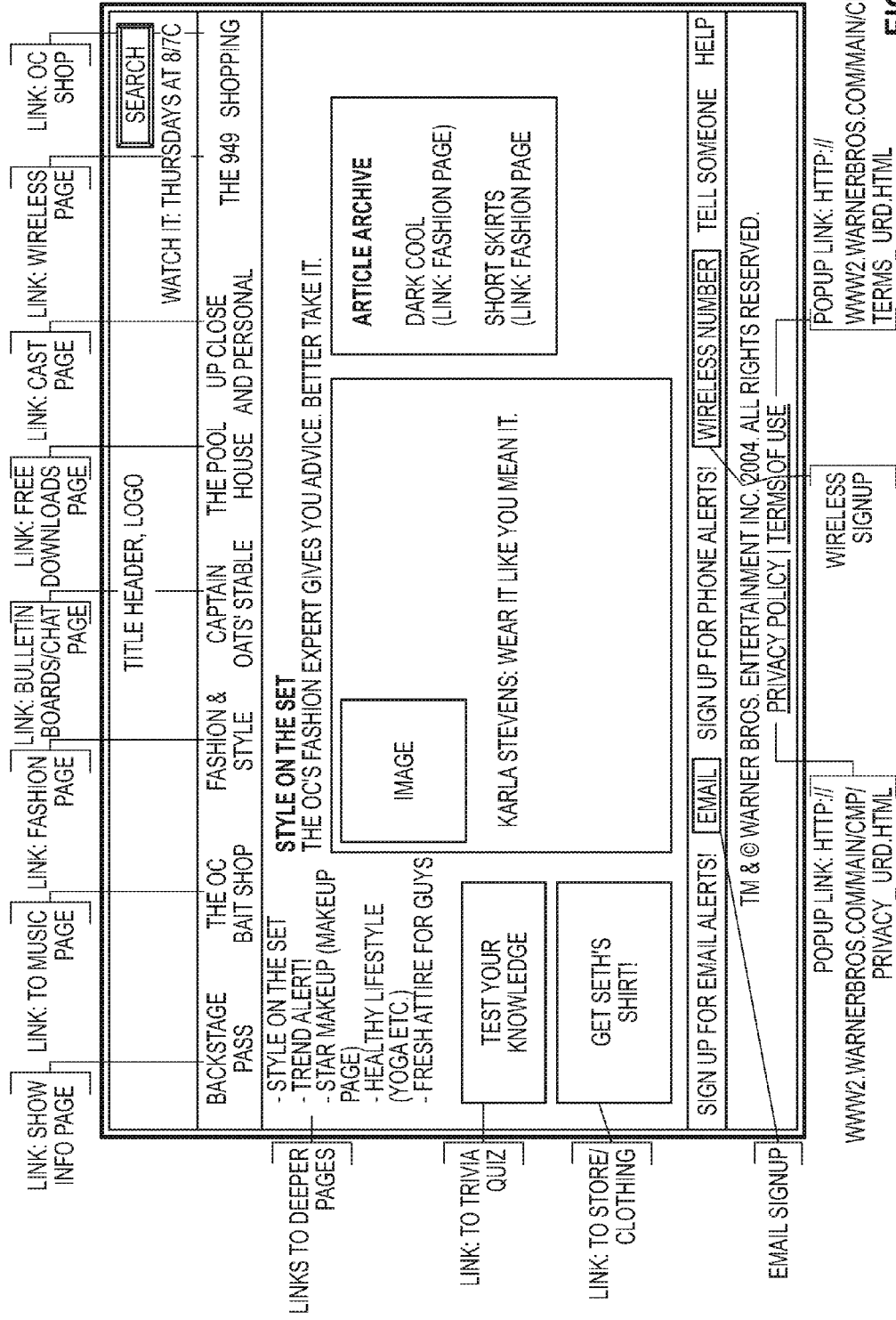
Figure 17:
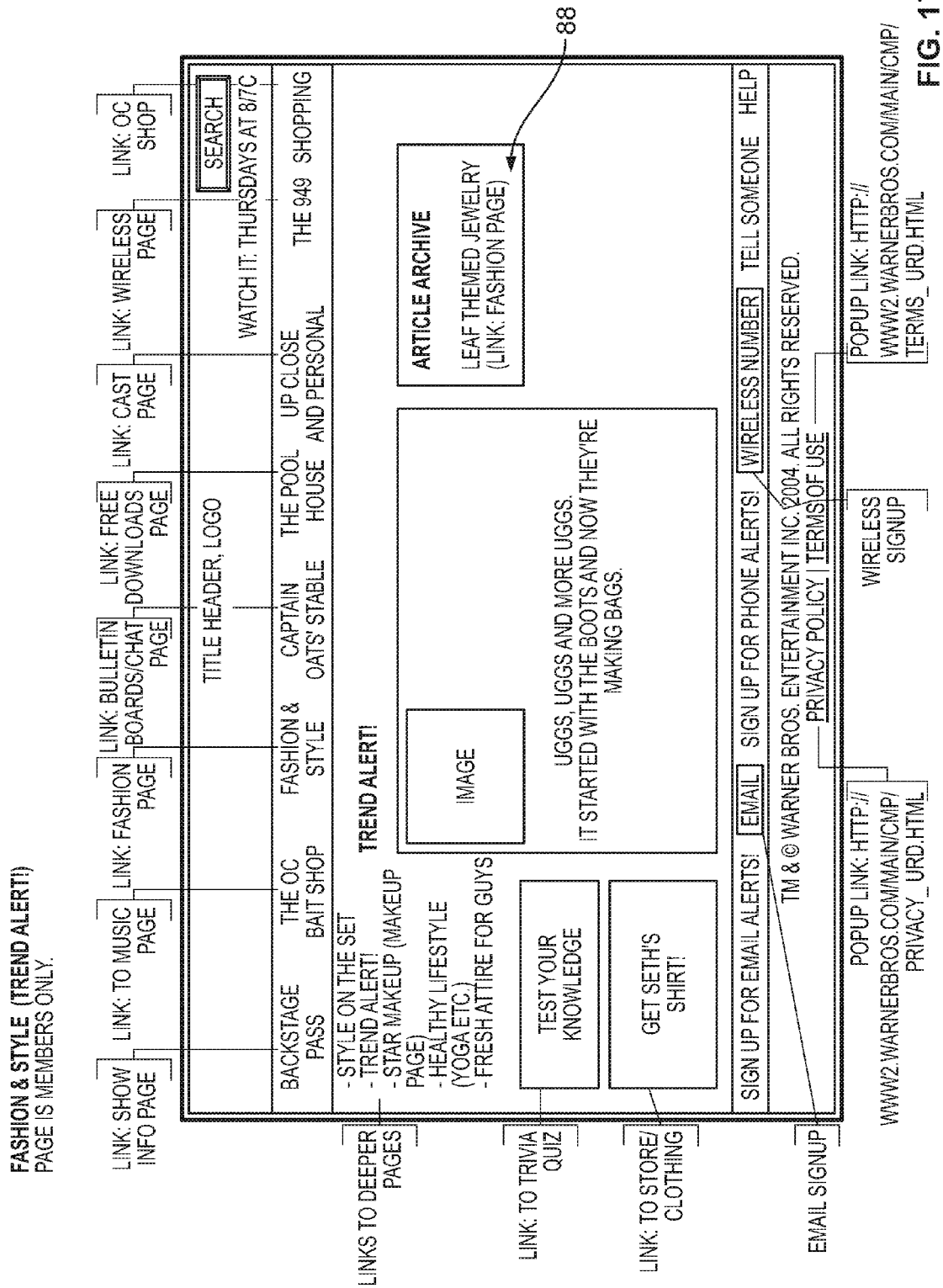
Figure 18:
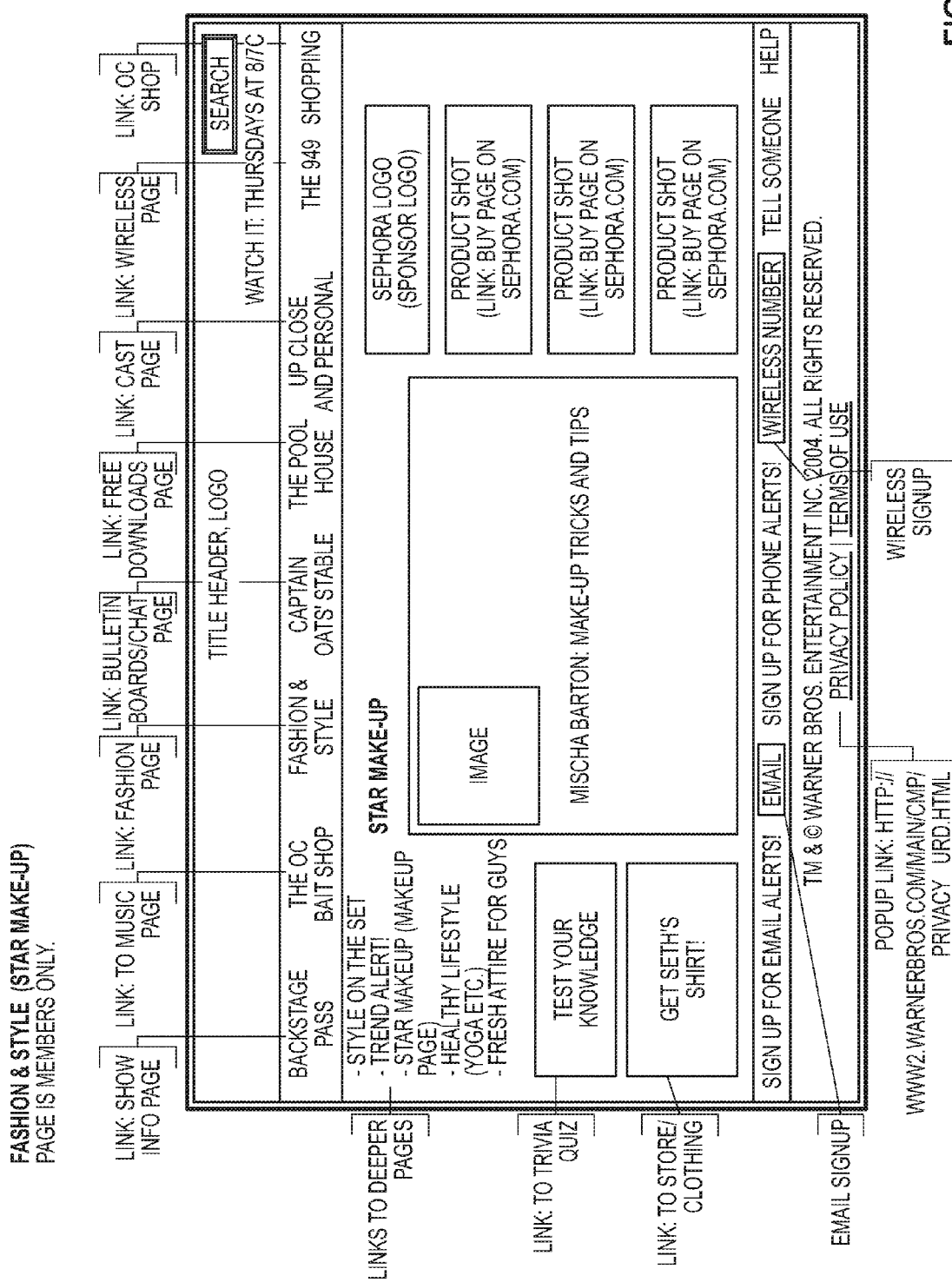
Figure 19:
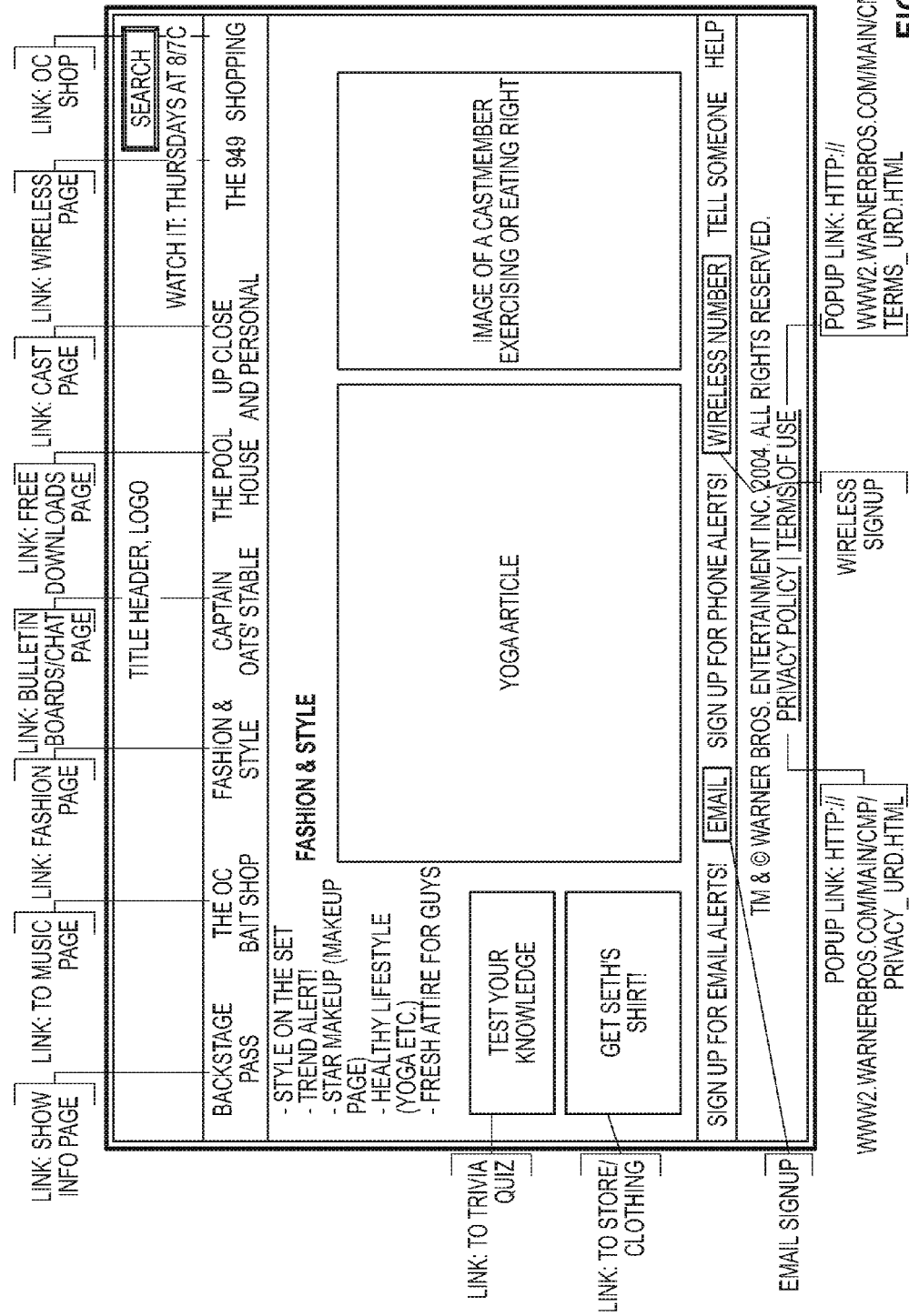
Figure 20:
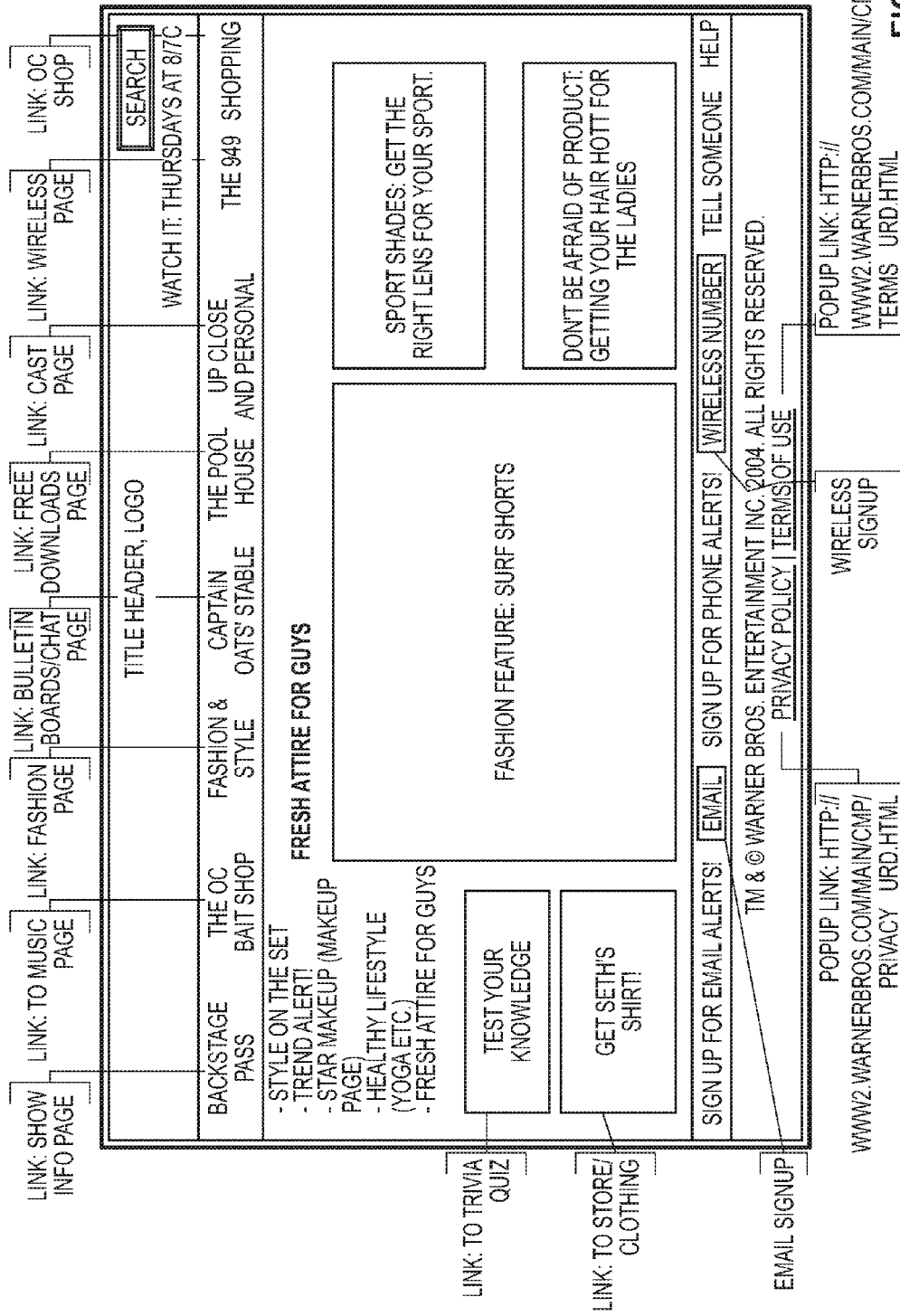
Figure 25:
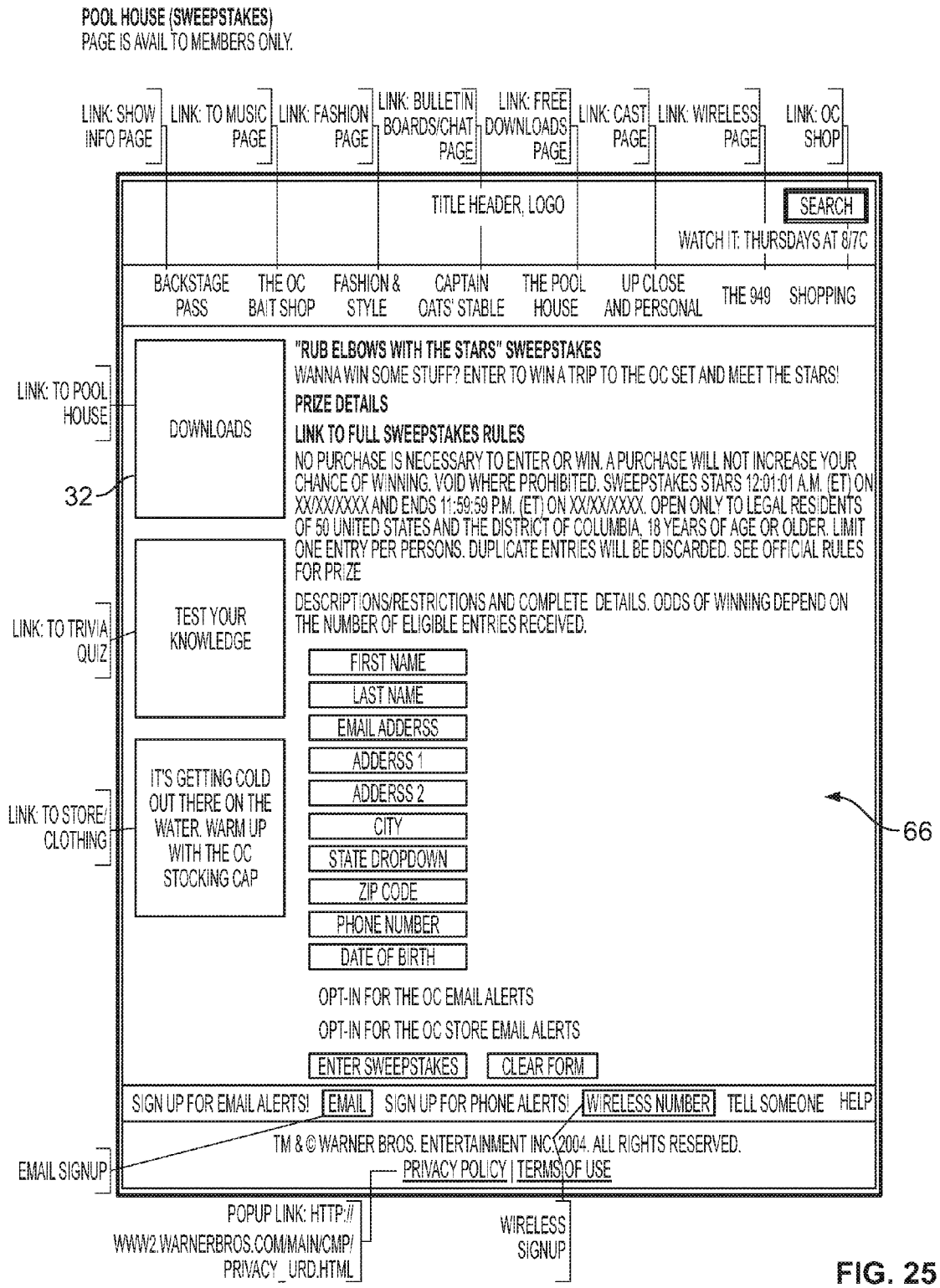
Figure 38:
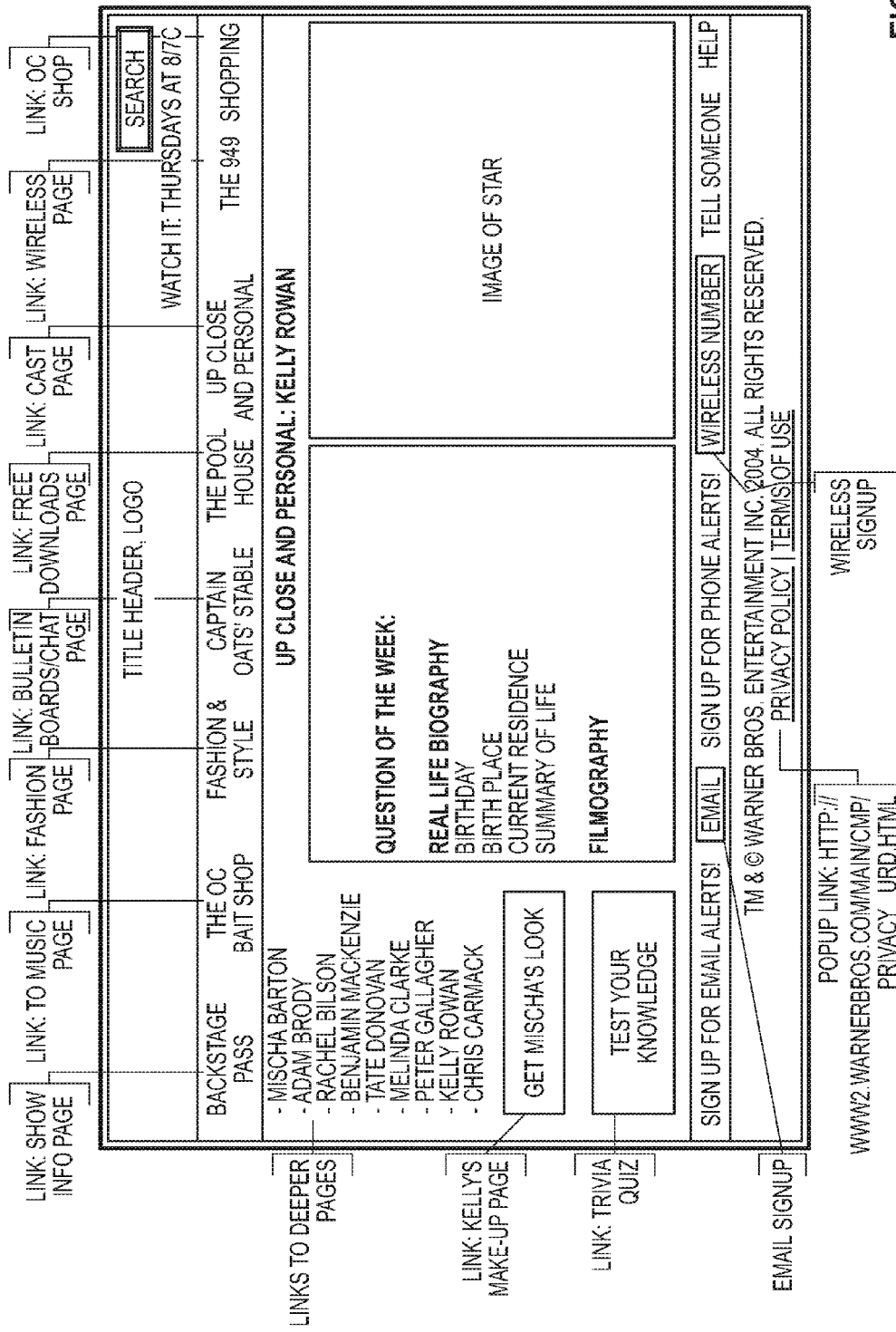
Figure 39:
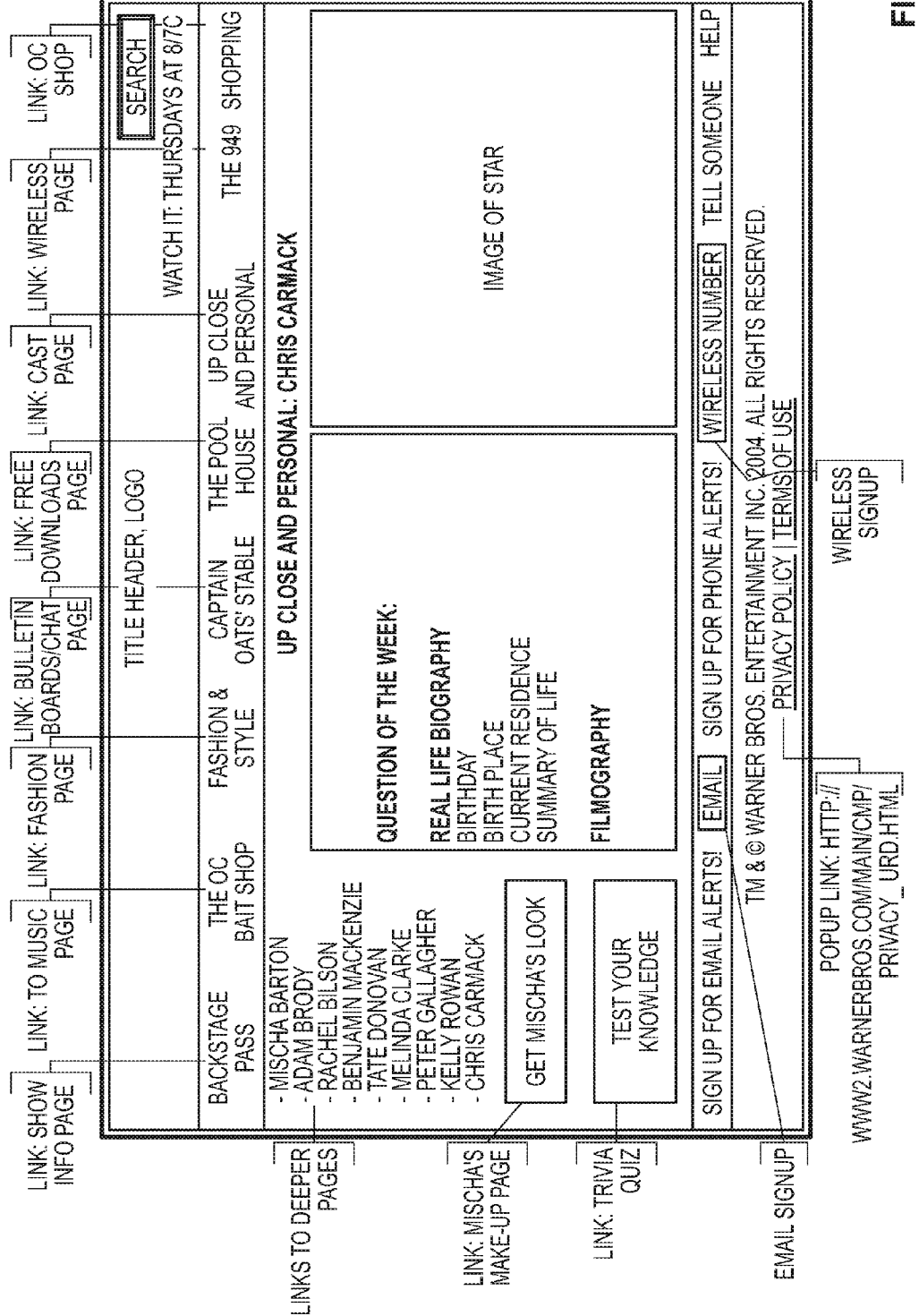
Figure 40:
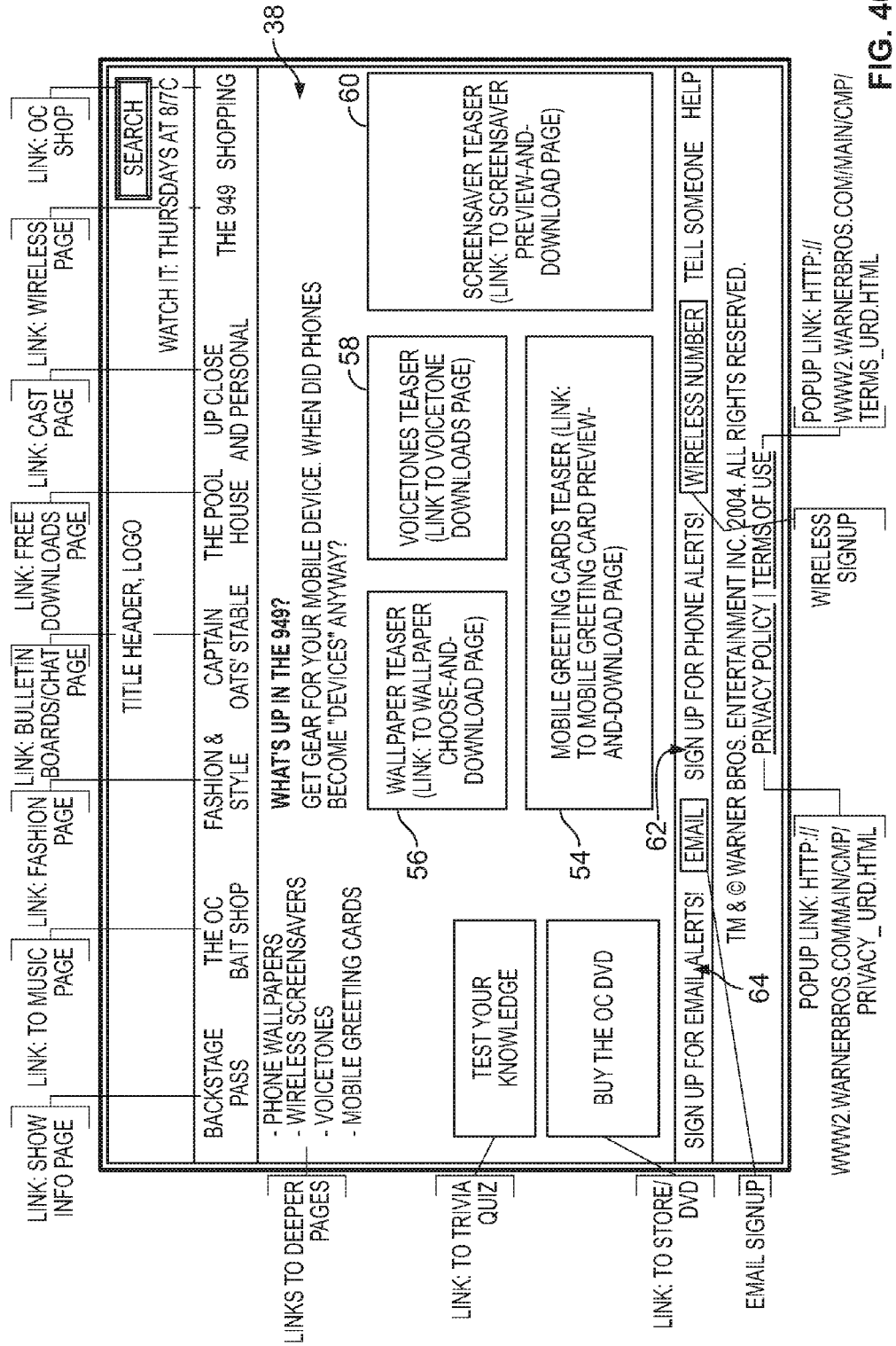
Figure 41:
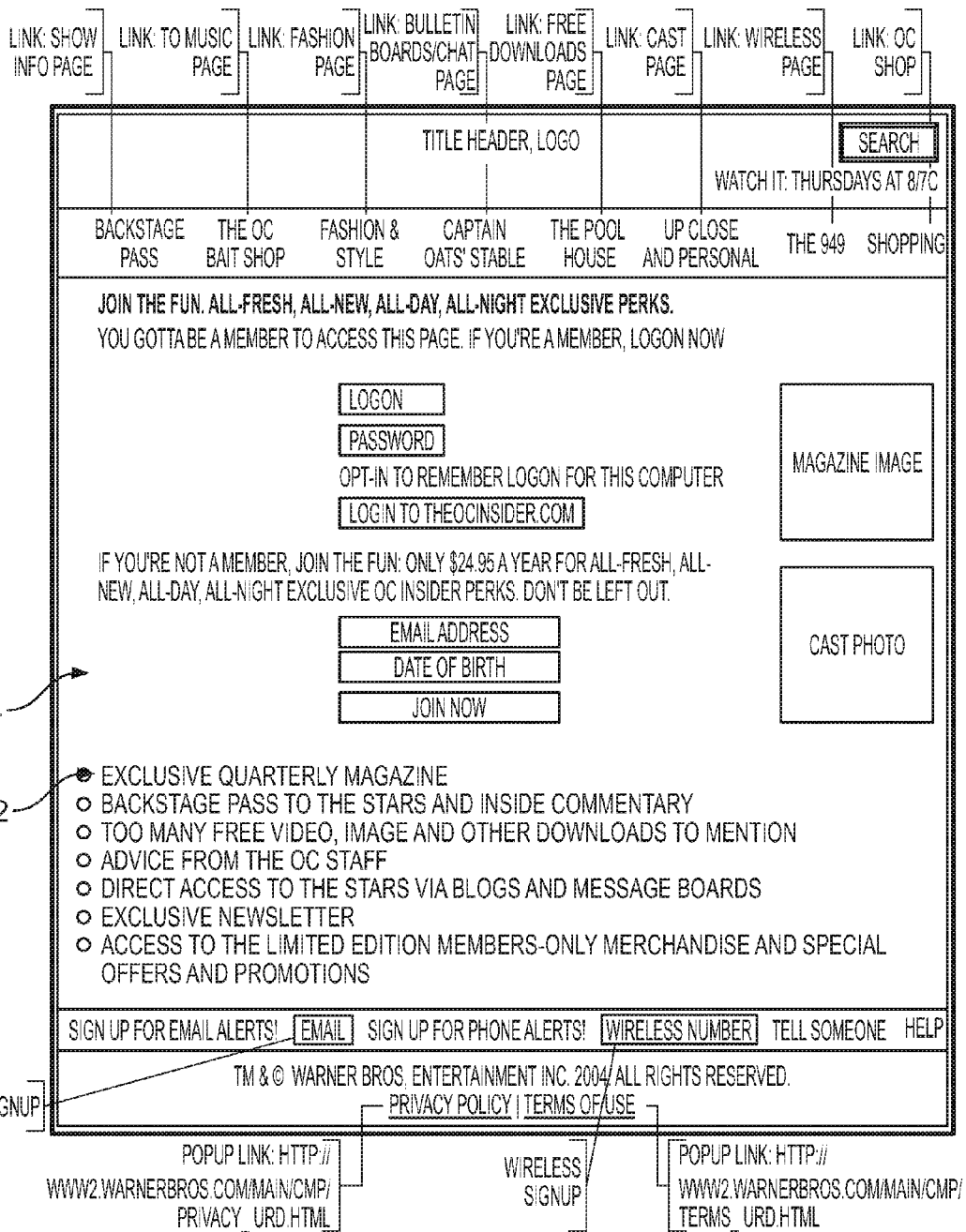
Figure 42:
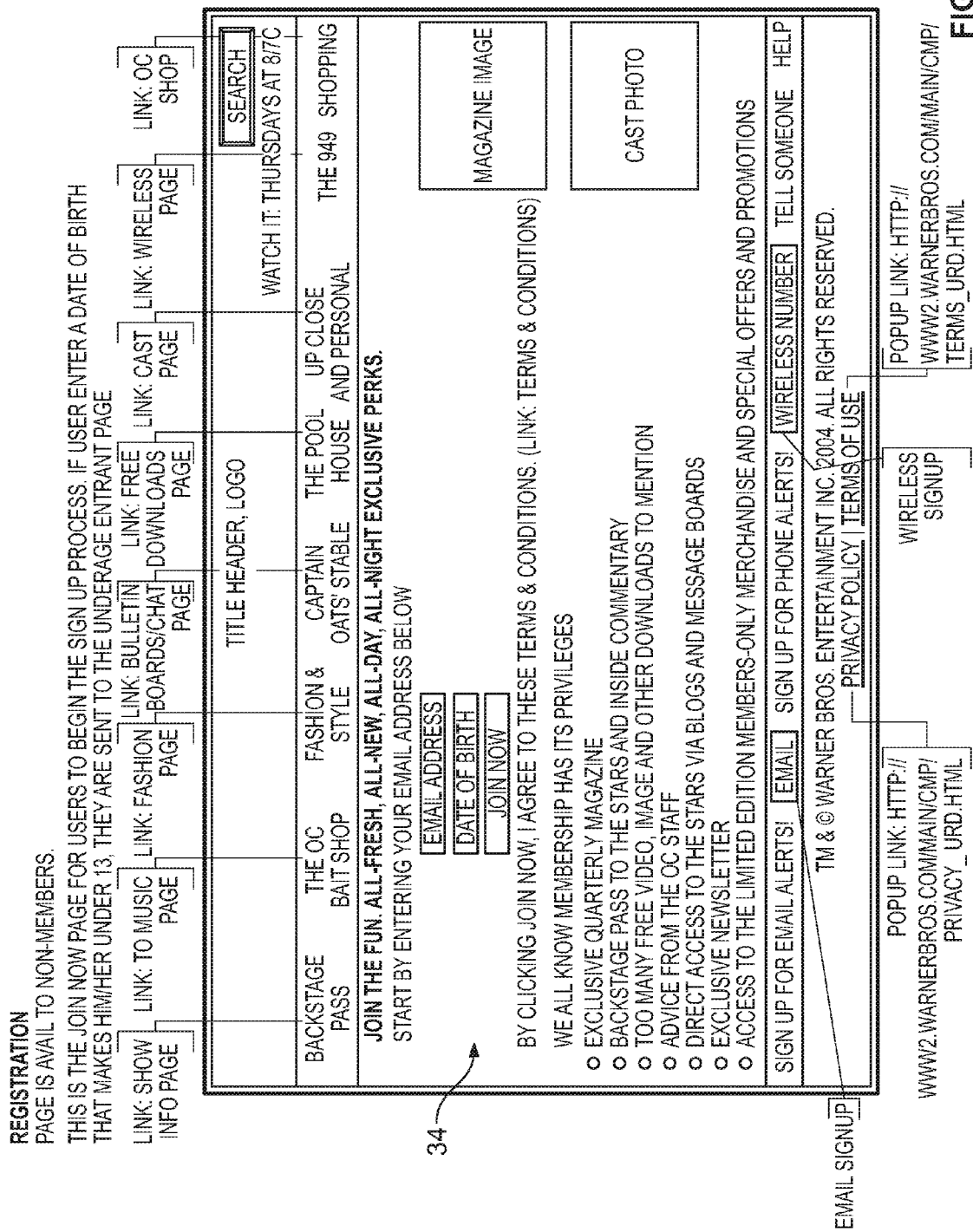
Figure 50:

The related media content can be packaged in any form that is suitable for sale. Examples of such types of packaging include, but are not limited to, DVD 26 (see FIG. 2), videotape, streaming video 28 (see FIG. 6), CD-ROM 30 (see FIG. 12), and download 32 (see FIG. 25). The related media content can be made available for purchase by the fans and other users of the show though any suitable means know in the art, or, alternatively, in one aspect of the present invention, can only be purchased via a subscription 34 (see FIGS. 2 and 41). In one embodiment, the method for providing fans and other users with a subscription is by using an Internet website 10 (see FIG. 1), or some other distribution channel, that allows users to sign up for a subscription. The subscription Internet service, or other paid distribution channel, allows subscribers exclusive, discounted, and/or free access to show-related content including, for example, the following: interactive games 36 (see FIGS. 2 and 38), wireless content (ring tones, wallpaper, photos, and/or clips) 38 (see FIG. 40), apparel 40 (see FIG. 15) that is inspired by the show, and magazines 42 (see FIG. 41).

Because most television shows are shot, filmed, approximately 5-7 weeks prior to the show's air date, there is only a limited window within which to package this related media content, and to sell it to the viewer, user, or other potential customer, thereby creating ancillary revenue streams. It is believed that once the content, or episode, is disseminated or able to be viewed, interest in the related media content likely will fade dramatically since consumers will be less willing to pay for related content, e.g., teaser 44 (see FIG. 3), for an episode or content that has already aired.

During the filming of a television episode for broadcast, additional footage 24 (see FIG. 6), behind the scenes pieces 18, and/or interviews 20 (see FIG. 7) with the cast and crew are also filmed that relate to the episode to be broadcast. This footage is then edited, converted into a digital video format from which it can be readily accessed, and then, made available via the subscription Internet website 10 (see FIG. 1), or some other paid distribution channel, prior to, or contemporaneous with, the initial broadcast of the particular television episode.

Figure 4:
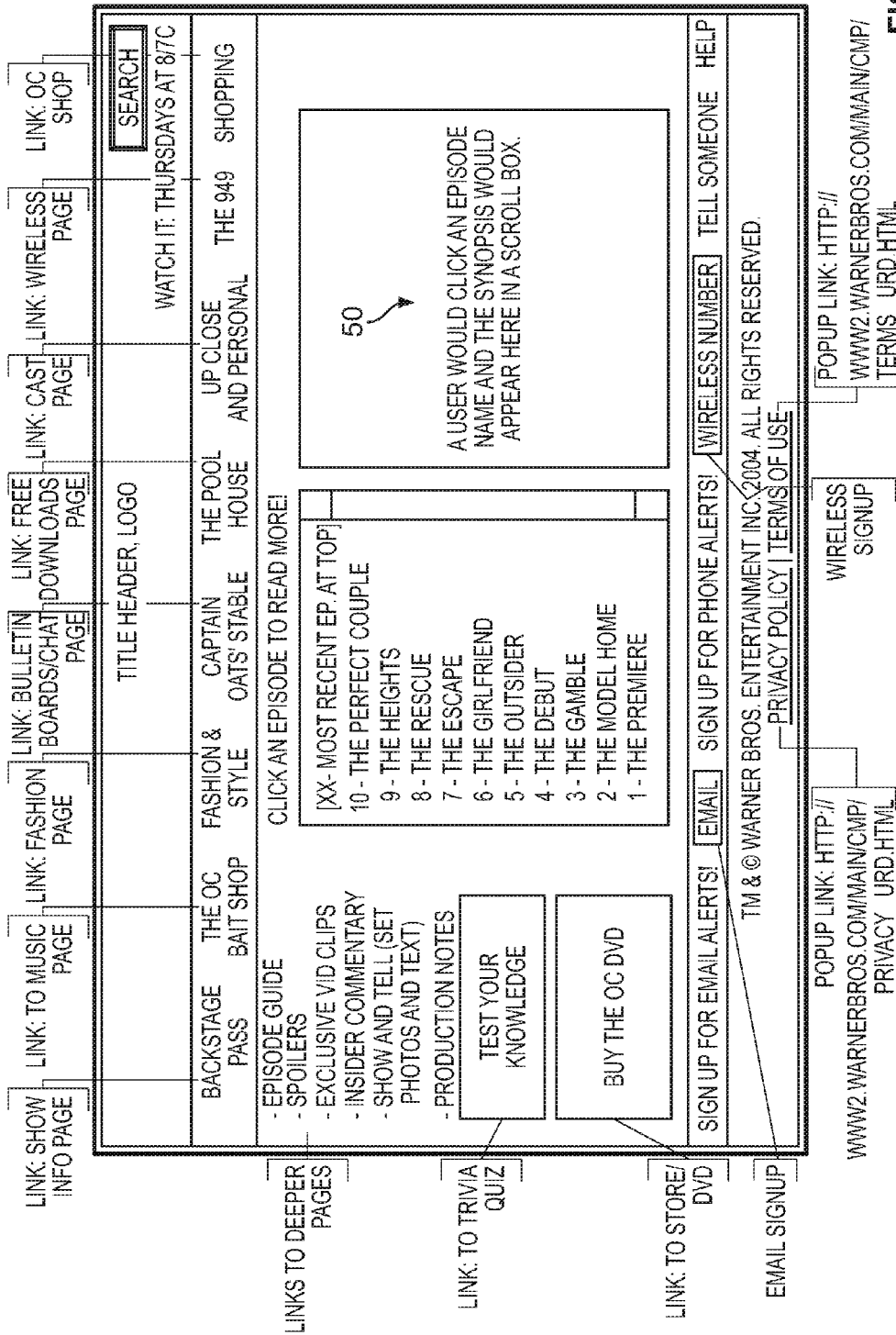
Figure 5:
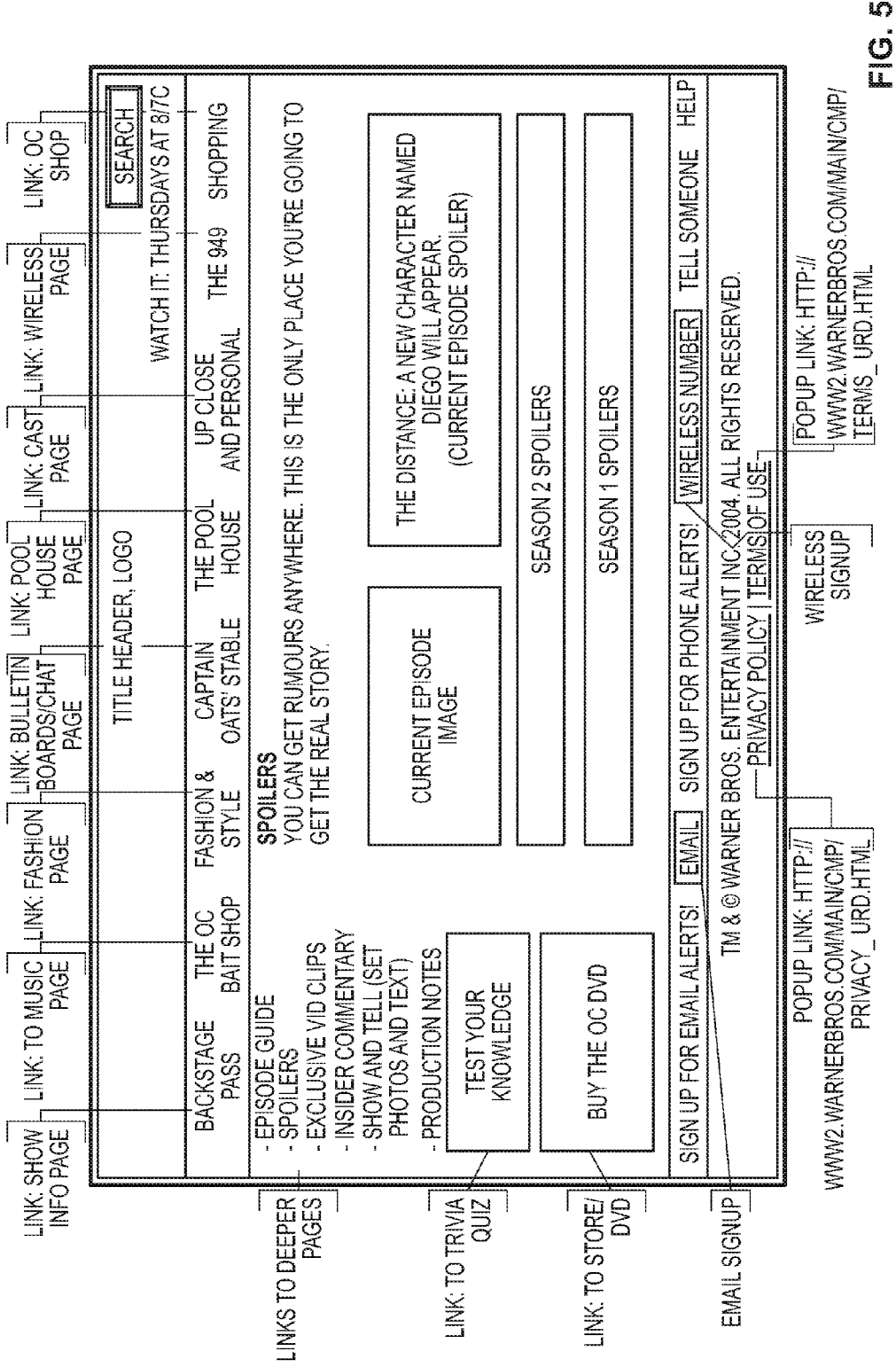
Figure 8:
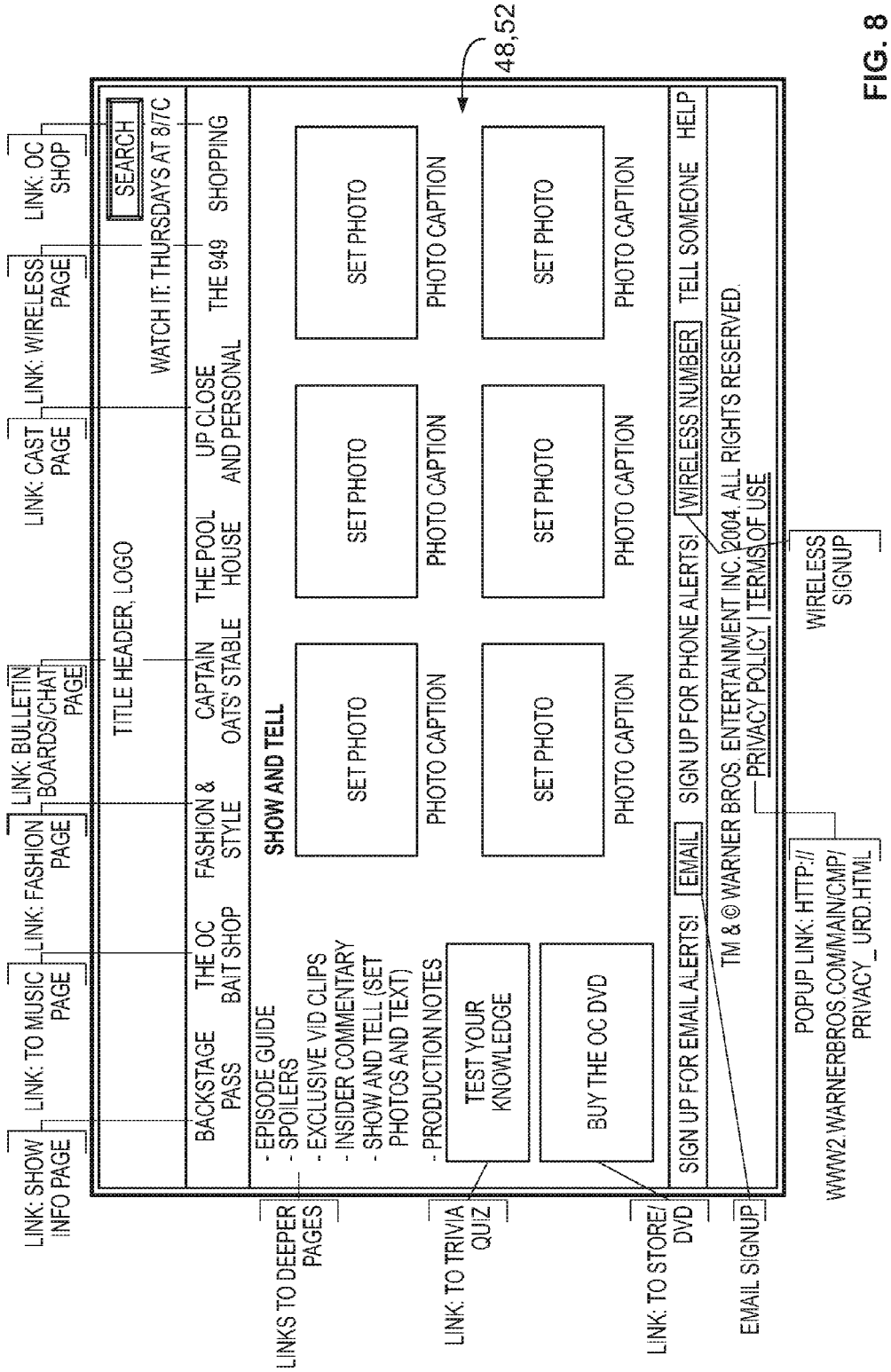
Figure 9:
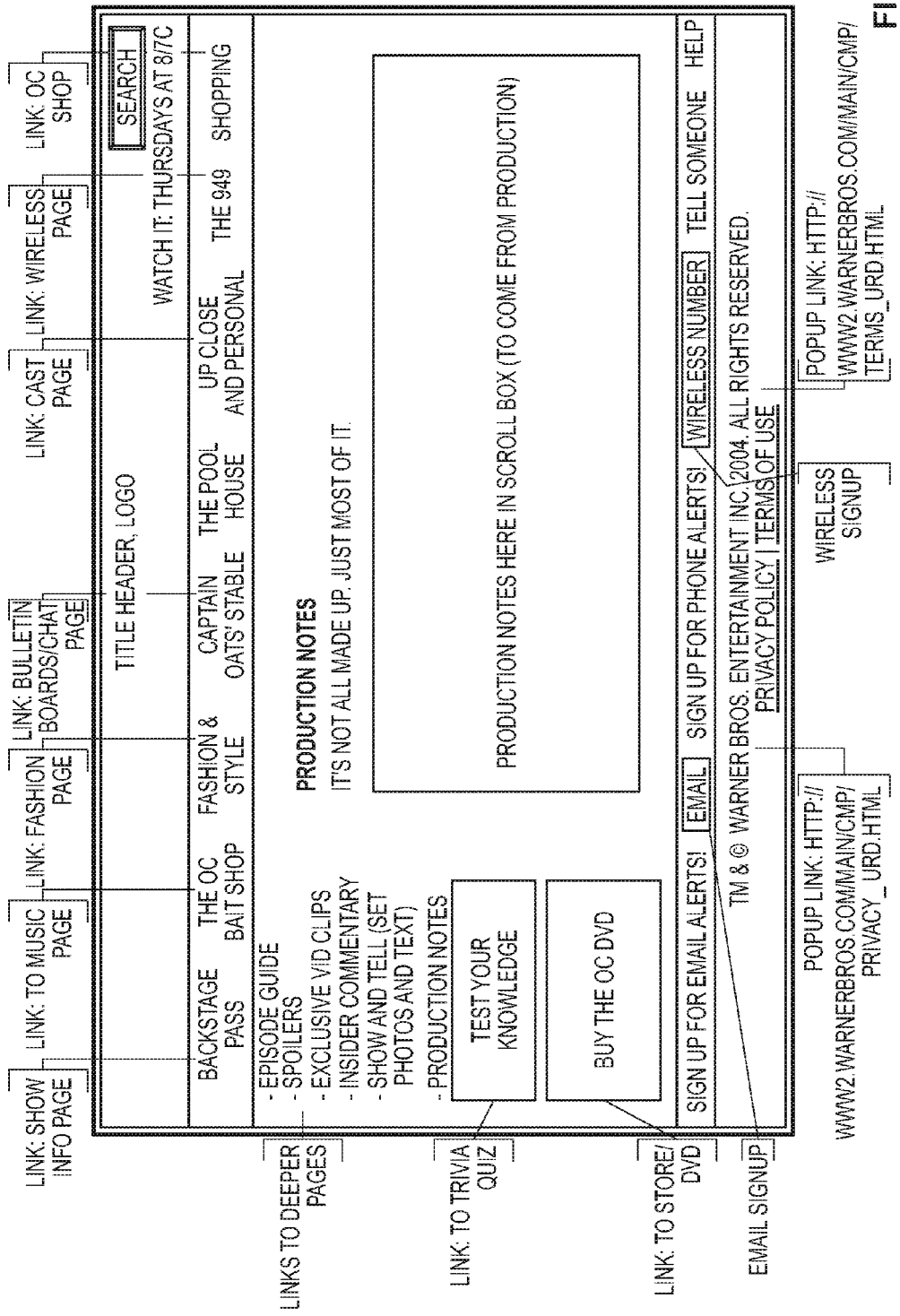
Figure 10:
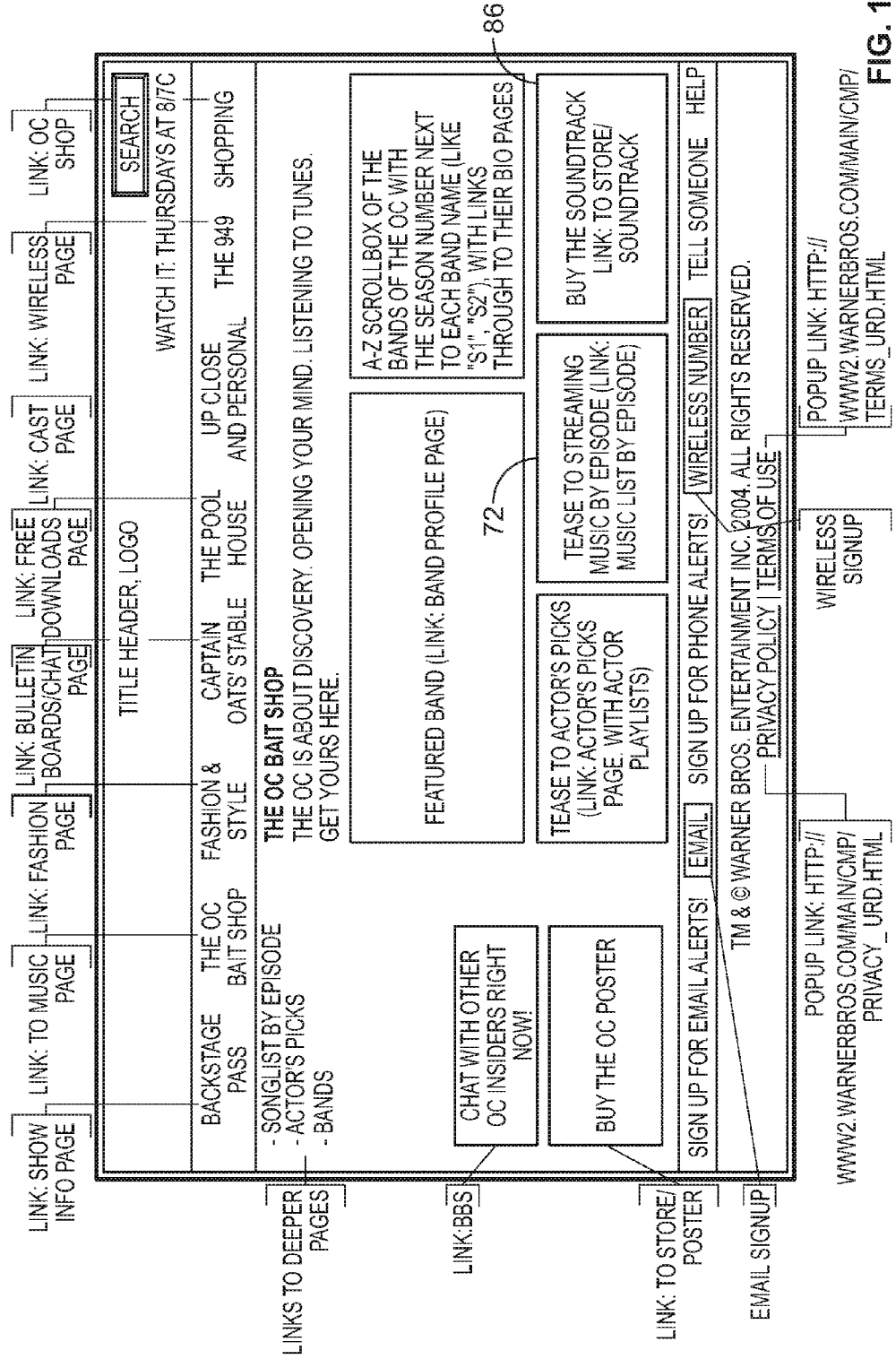
Figure 11:
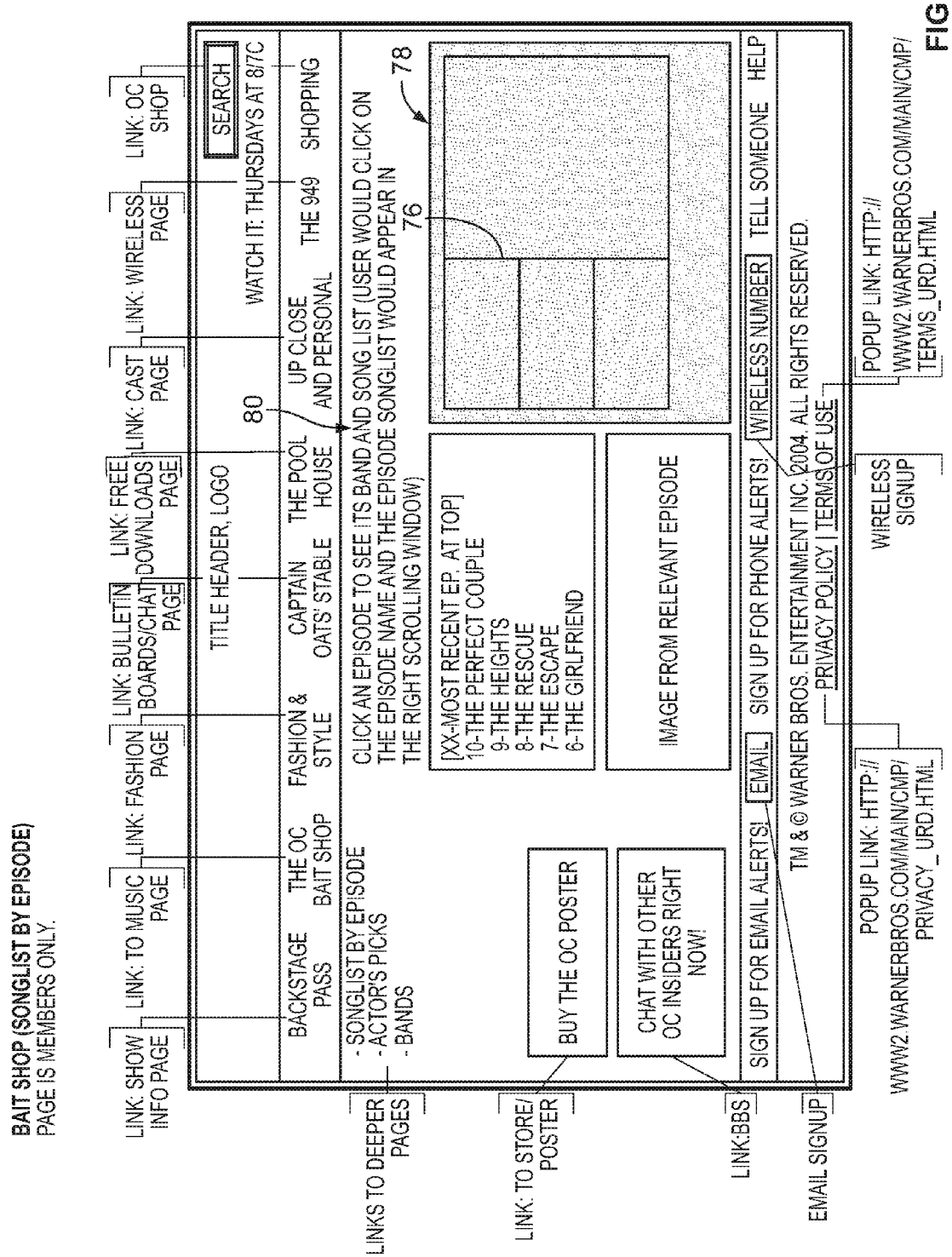
Figure 21:
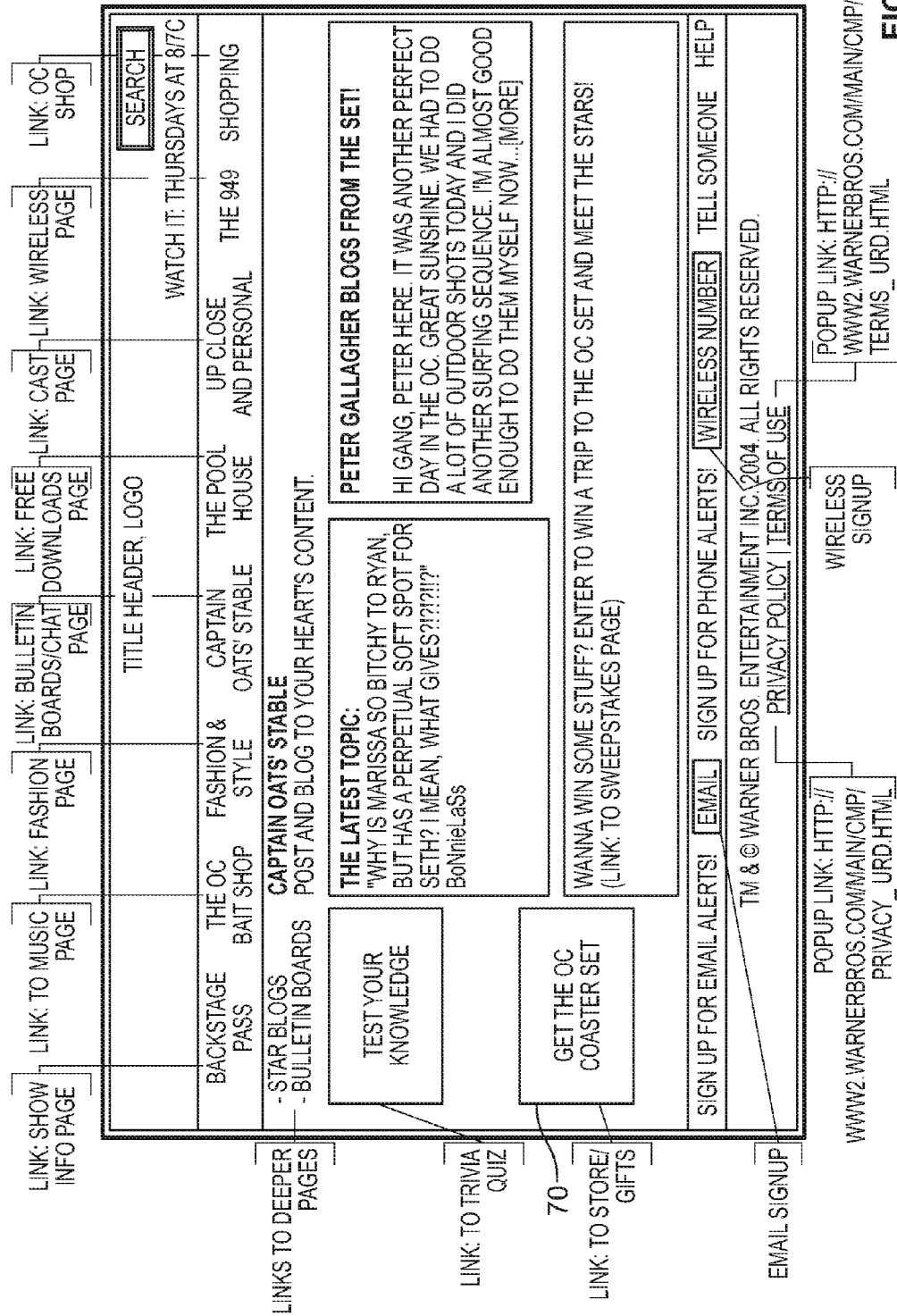
Figure 22:
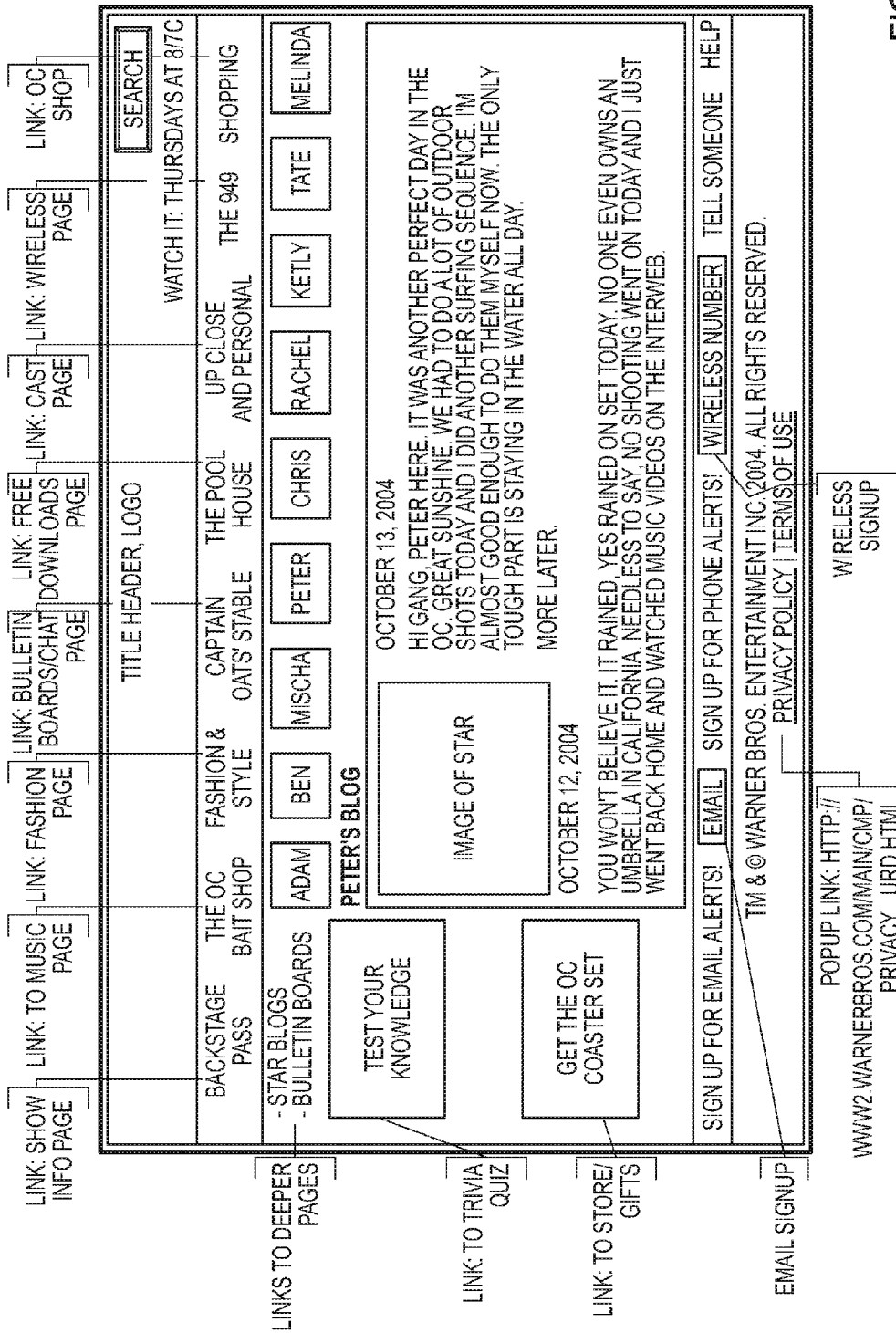
Figure 23:
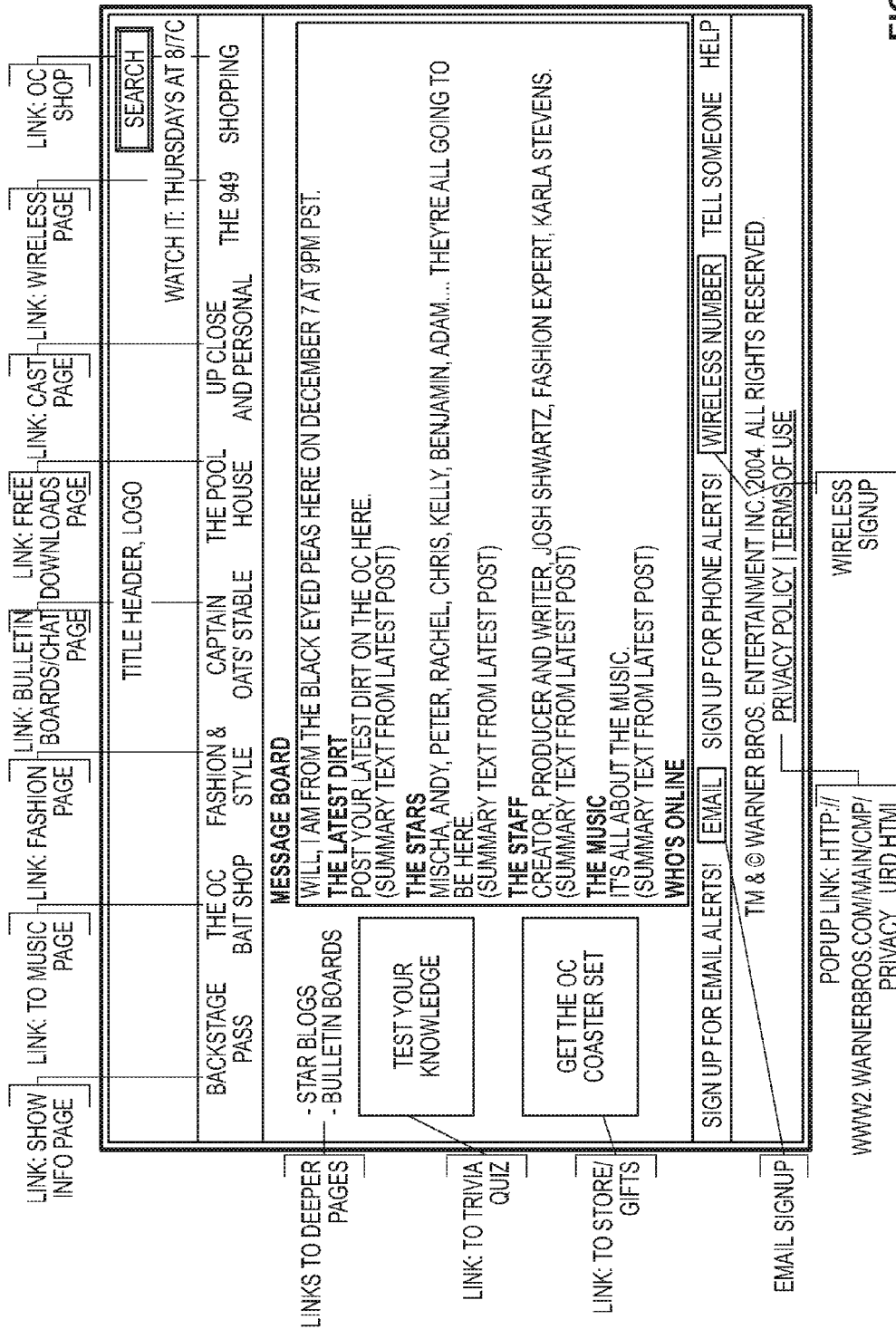
Figure 24:
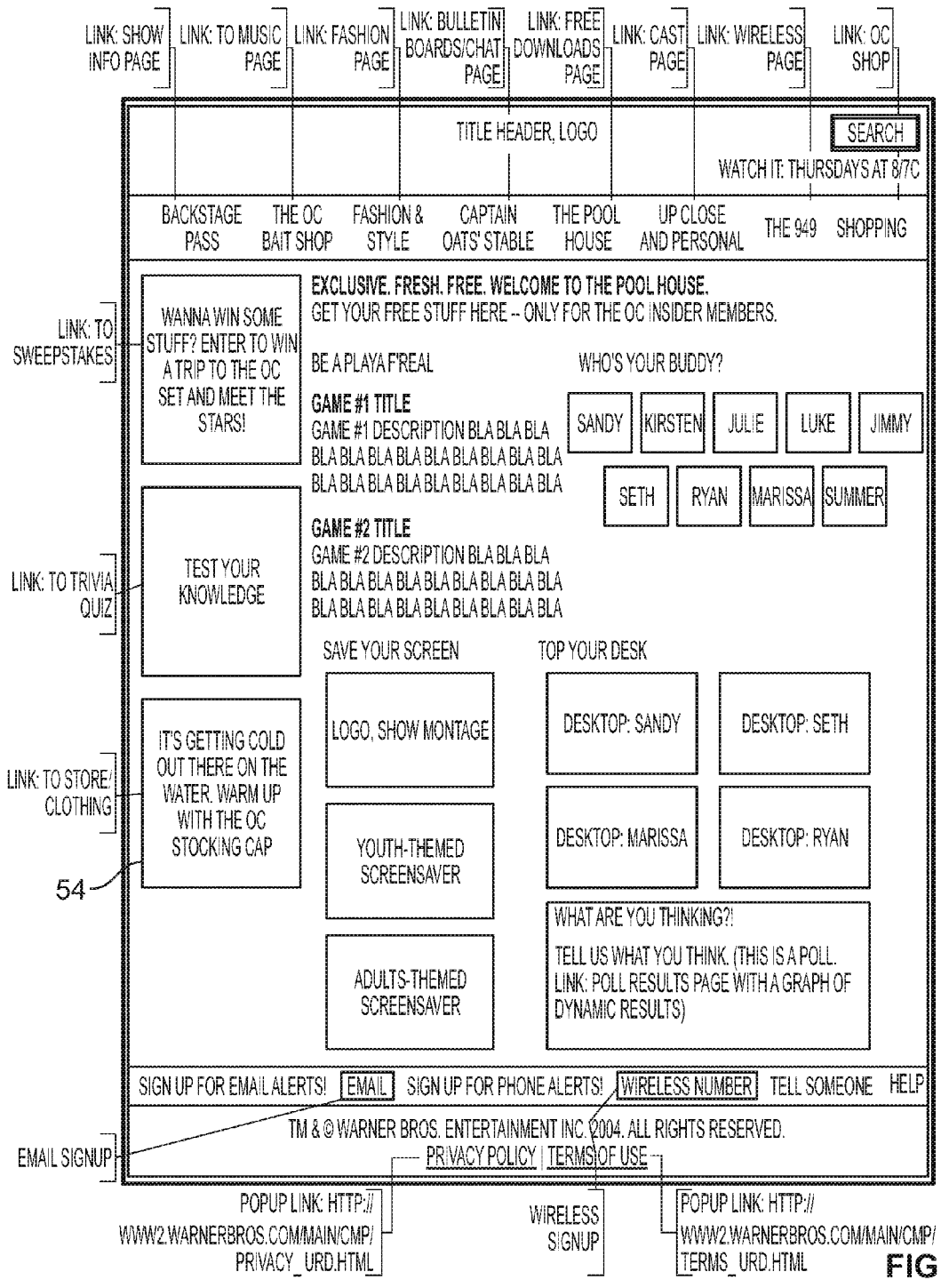
Figure 26:
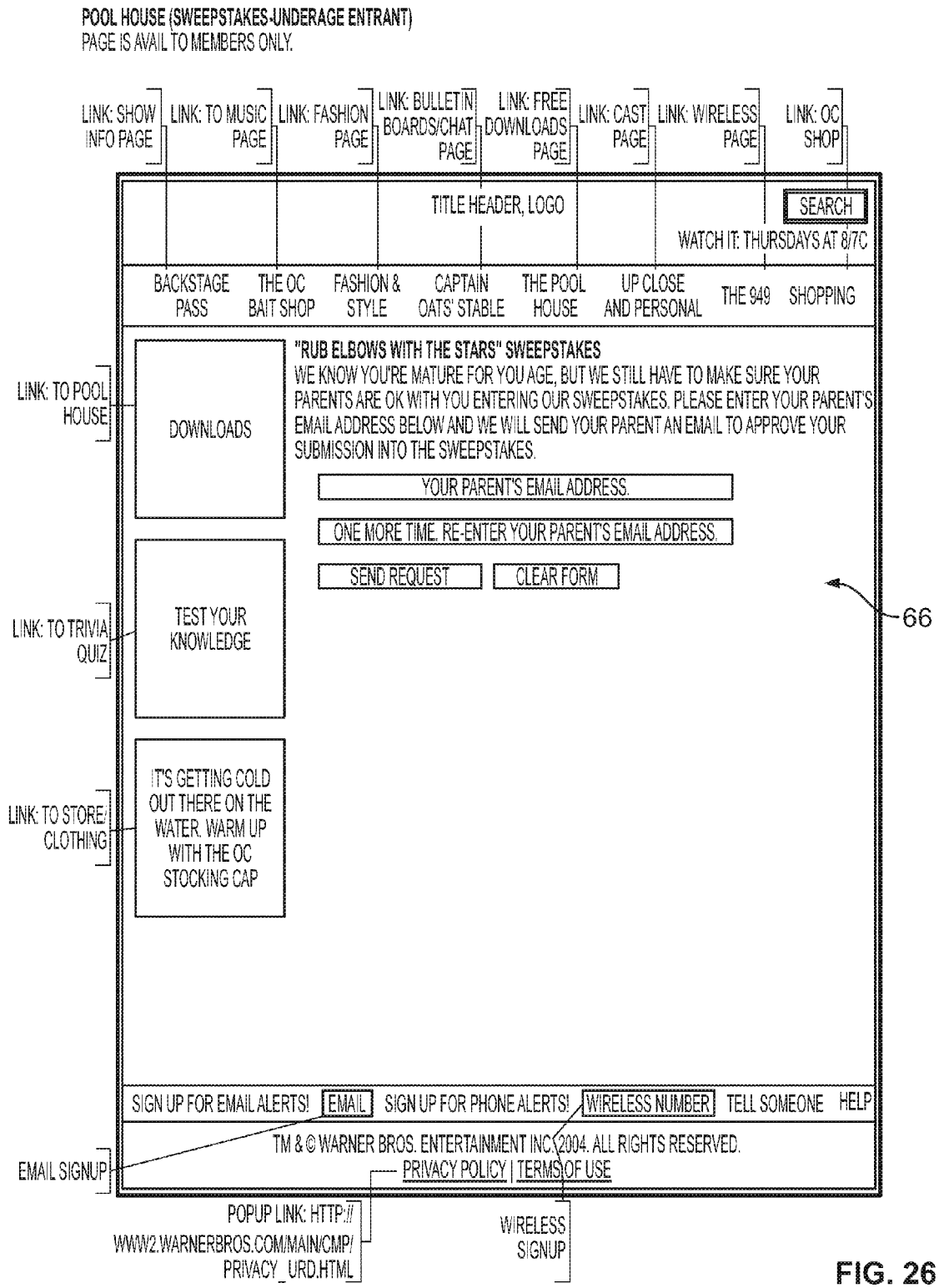
Figure 30:
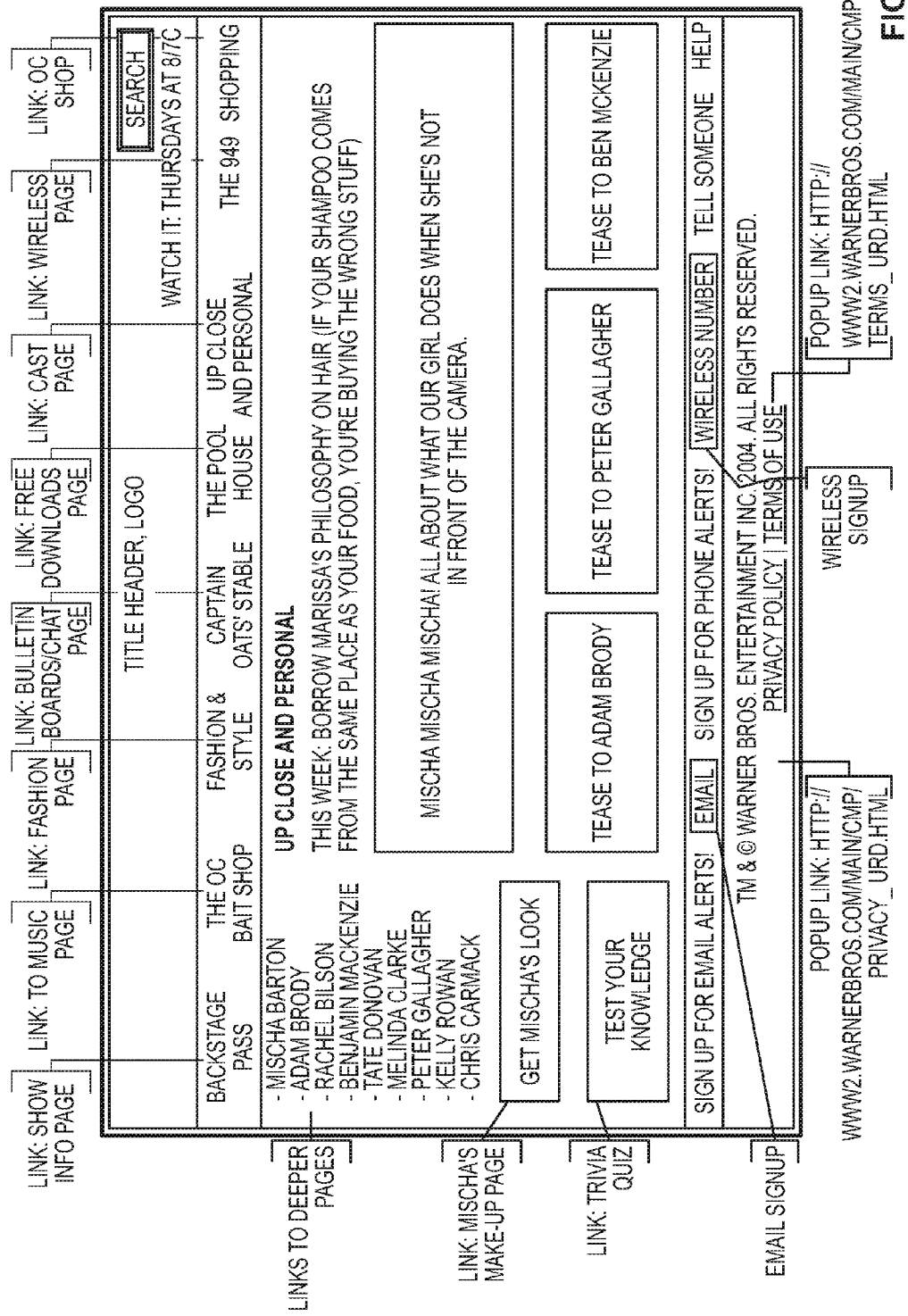
Figure 31:
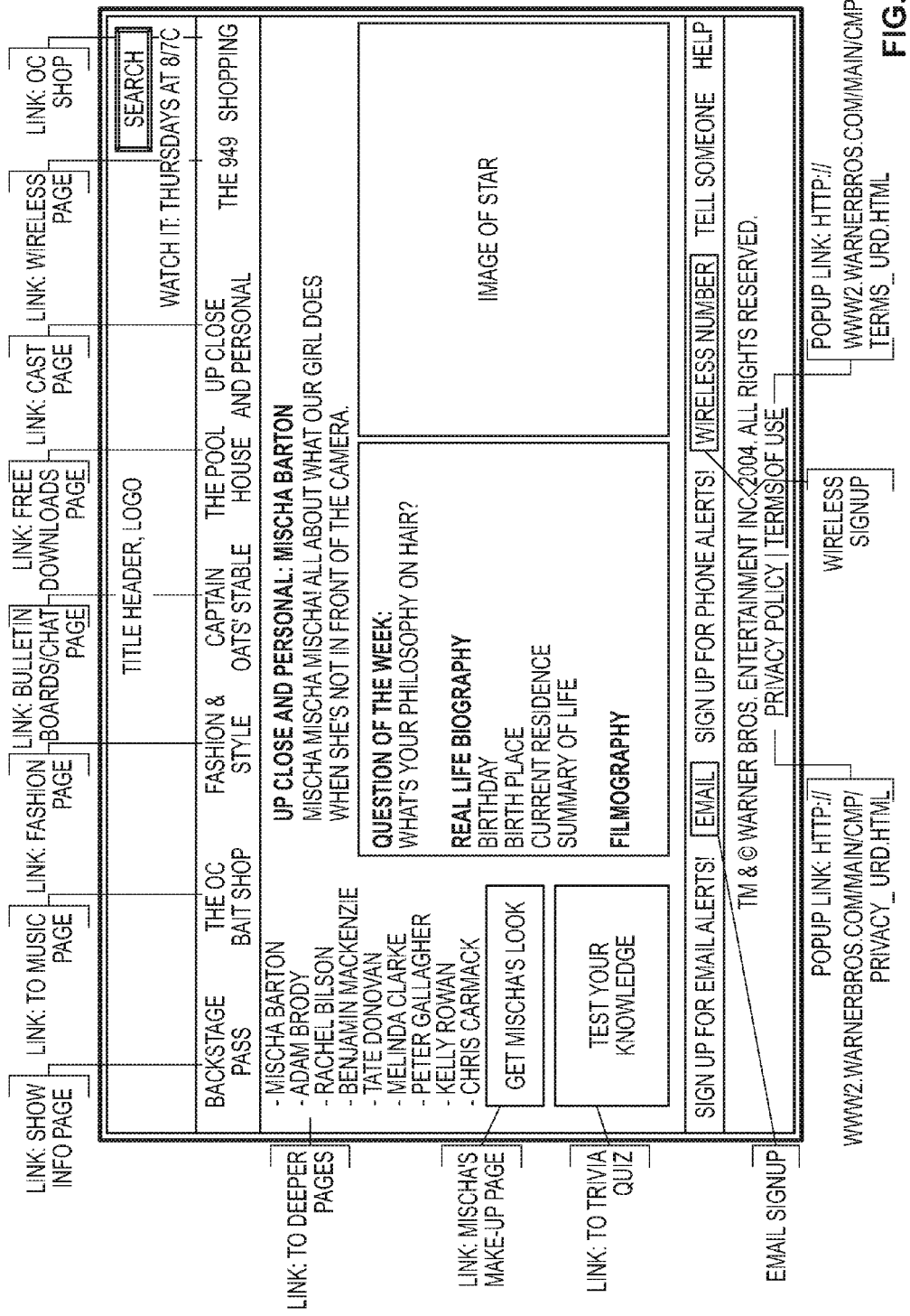
Figure 32:
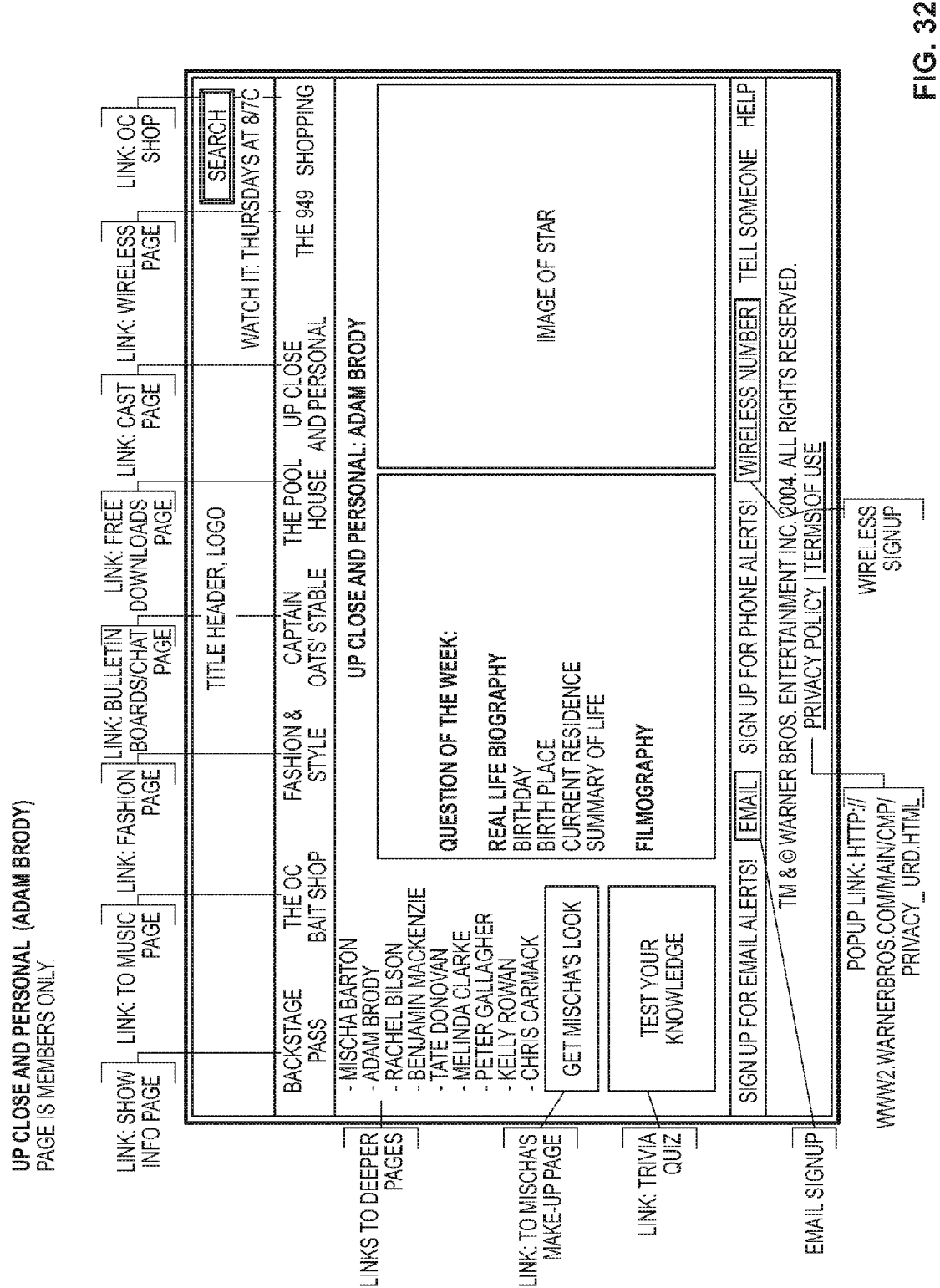
Figure 33:
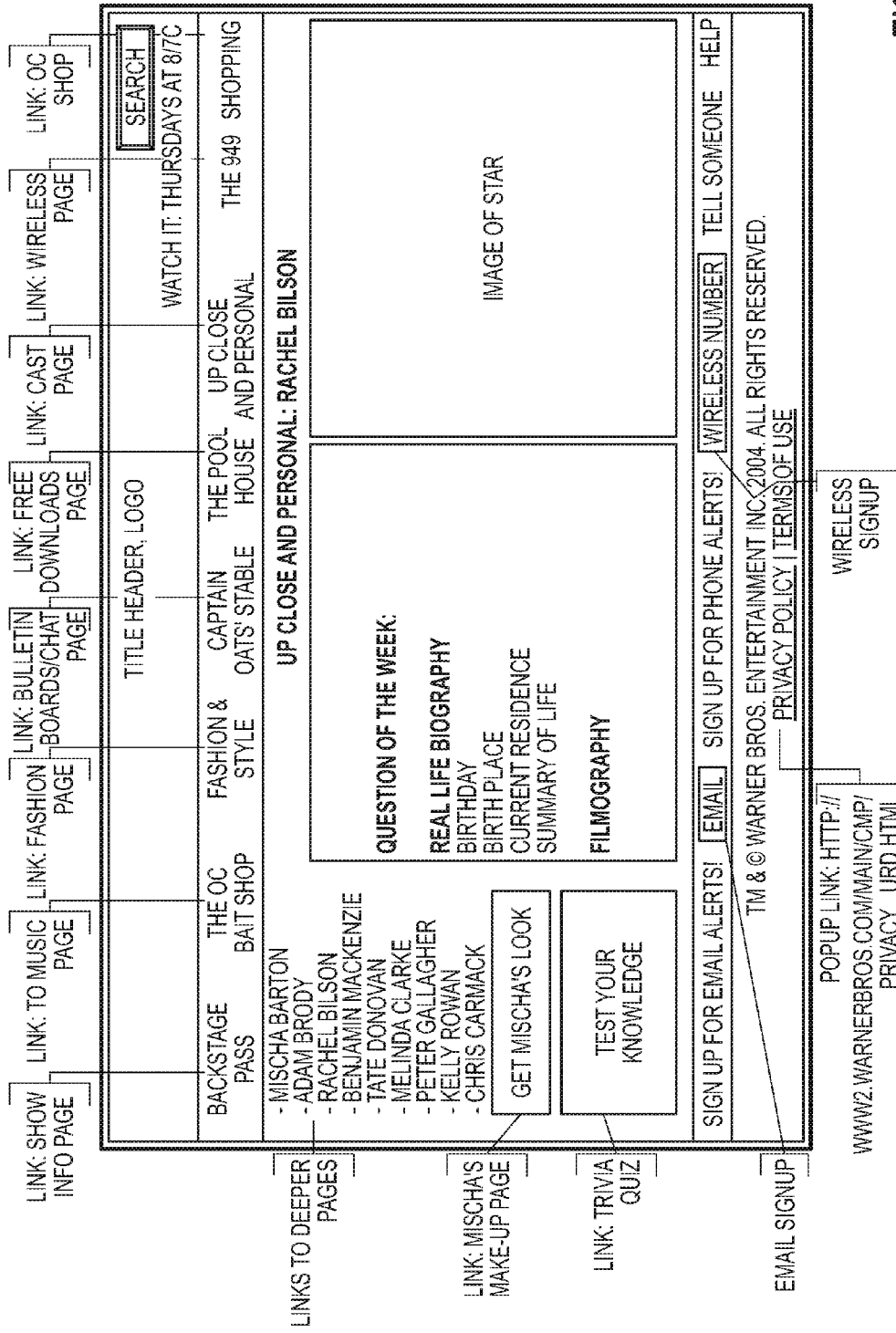
Figure 34:
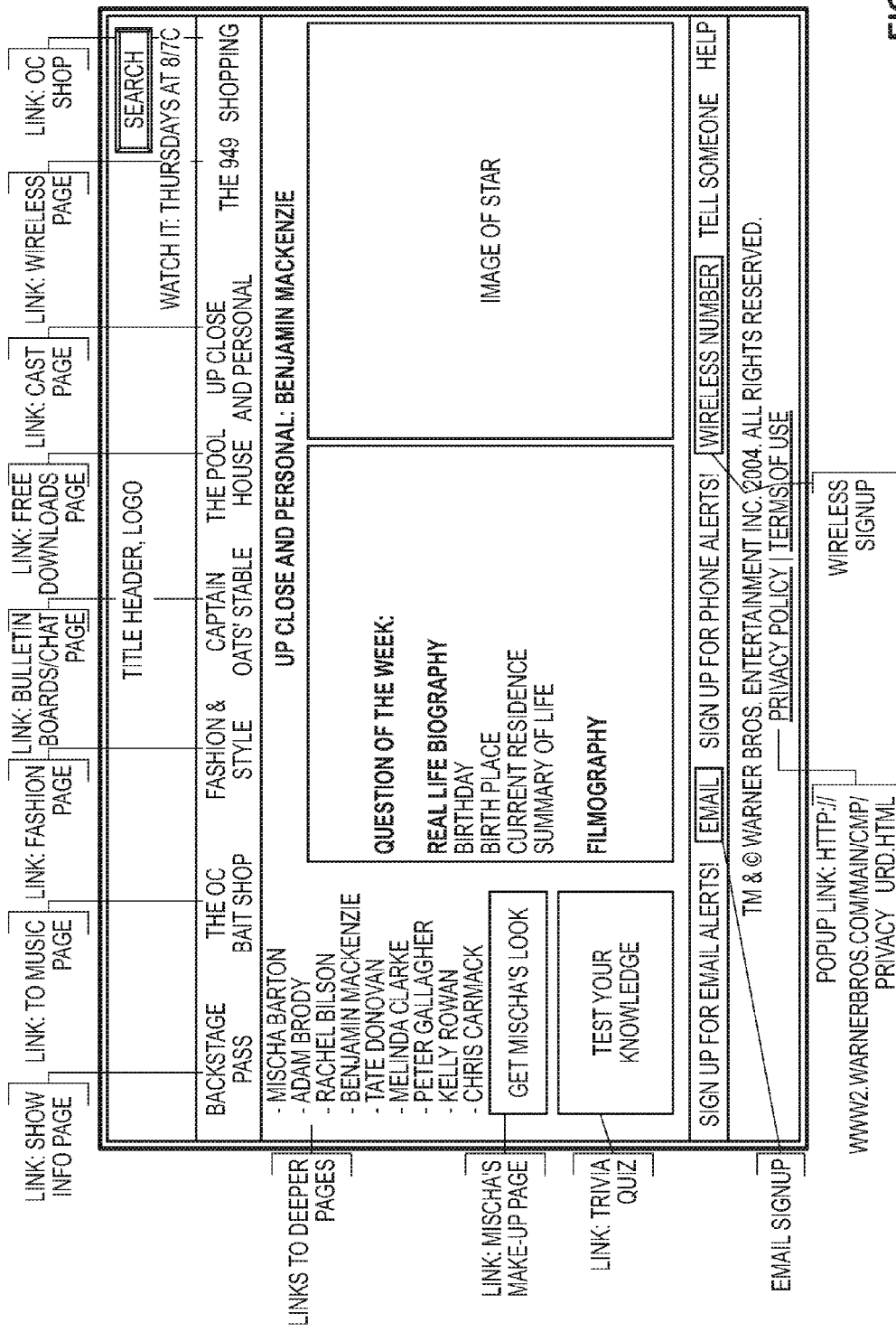
Figure 35:
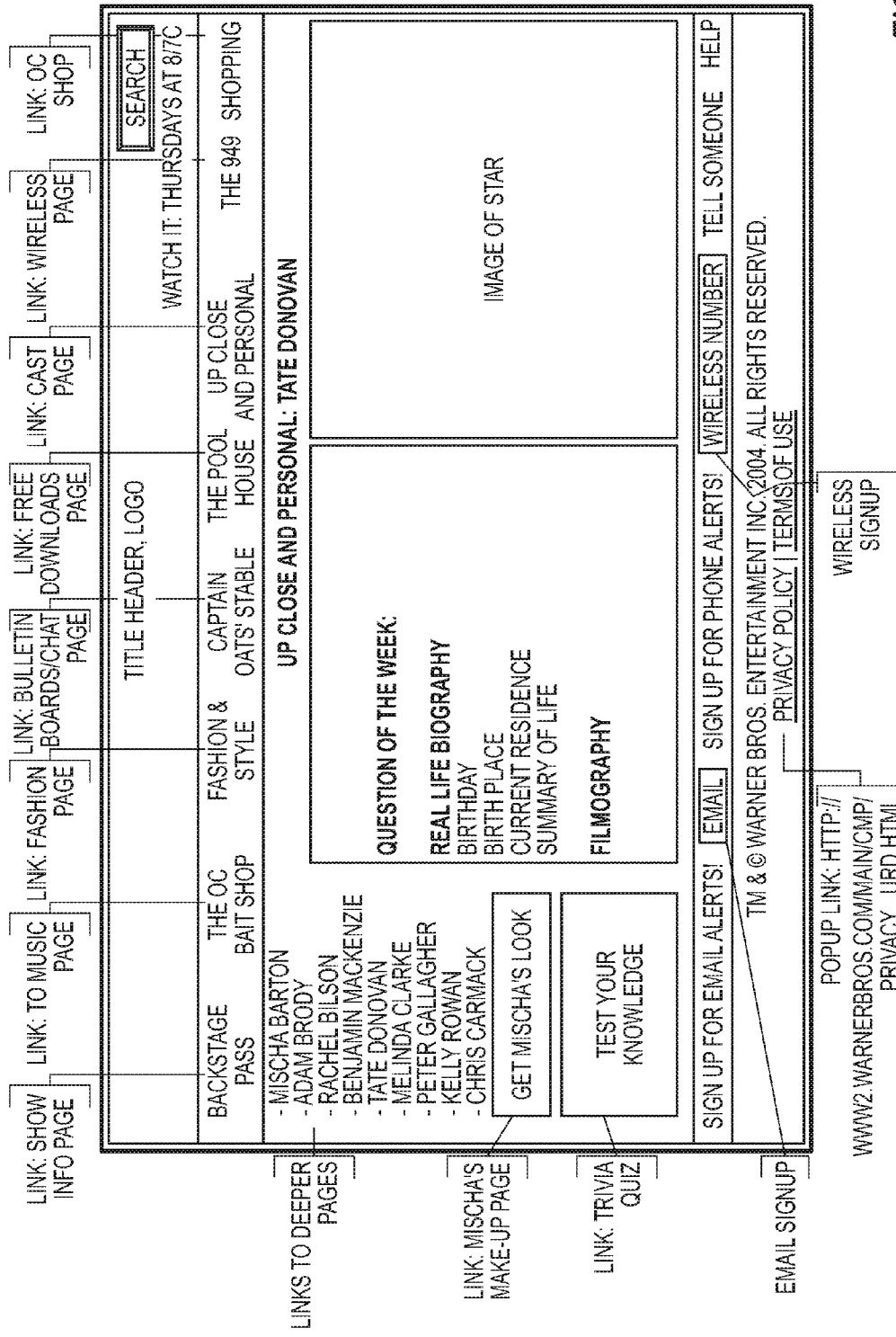
Figure 36:
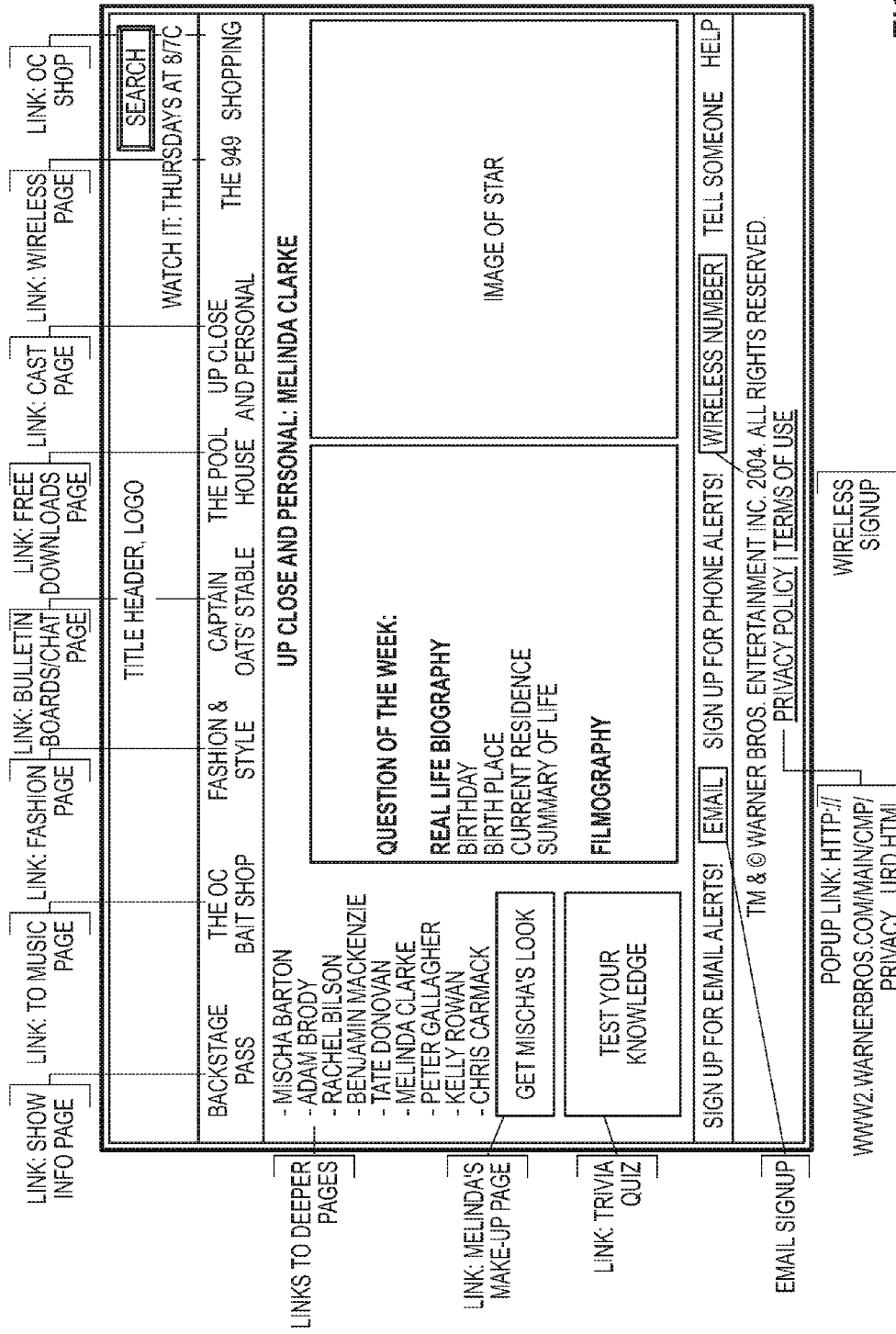
Figure 37:
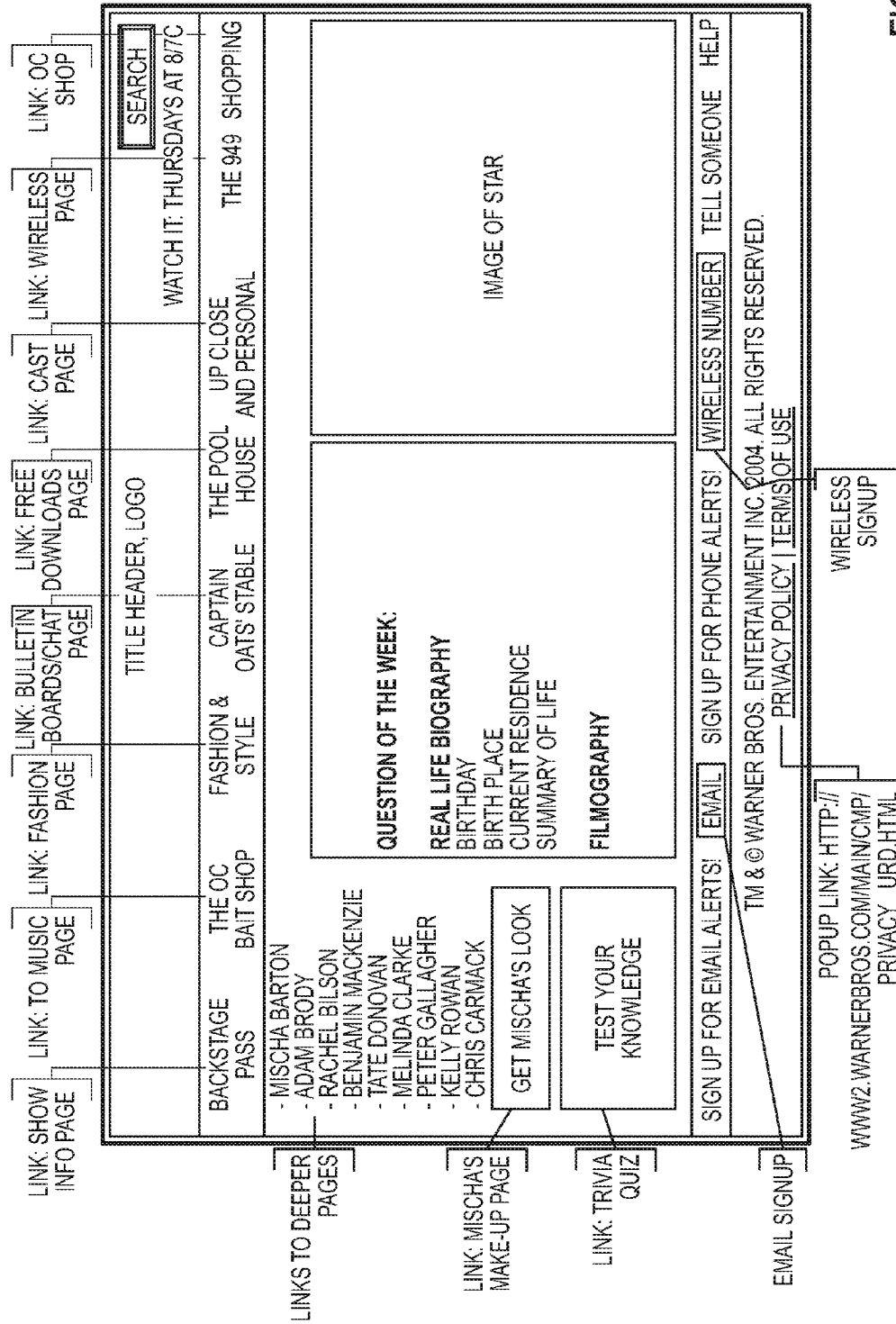

Other content related to particular television episodes can also be made available to subscribers before or contemporaneous with the airing of such episodes. For example, the content provided to subscribers can include electronic copies or hardcopies of episode scripts 46 (see FIG. 3), including scripts with notes written by individuals affiliated with the television show episodes; video journals for characters on the episode; episode and/or show-specific photographs 48 (see FIG. 8); fan magazines 42 (see FIG. 41) for the show; novelizations 50 (see FIG. 4) of the show, or episodes of the show; episode and/or show-related scrapbooks 52 (see FIG. 8), greeting cards 54 (see FIG. 40), and comic books; show-branded consumer items, e.g., clothing (discussed below in greater detail) 40 and 50 (see FIGS. 15 and 4, respectively) and wall paper 56 (see FIG. 40); merchandise that has been autographed by an individual affiliated with the show; DVDs 26 (see FIG. 2) or videotapes of episodes; episode and/or show-related ring tones 58 (see FIG. 40) for wireless products, e.g., cellular phones; episode and/or show-related screensavers 60 for computers and wireless products; wireless and Internet-based alerts 62 and 64, respectively, for the show, e.g., show time alerts; and episode and/or show-related games 36 (see FIGS. 3 and 28), sweepstakes 66 (see FIGS. 25-27), and giveaways 68 and 70 (see FIGS. 15 and 21, respectively). Electronic versions of the above items can be made available via the previously mentioned subscription Internet website 10 (see FIG. 1) or other paid distribution channel, prior to, or contemporaneous with, the broadcast of the particular television episode.

In yet further aspects that are illustrated by FIGS. 10-14, ancillary revenue streams are created by (1) producing episodes of a television program which utilize music 72, which can consist of entire songs 74, partial songs 76, clips, or music videos, from various artists 78, (2) creating and populating a database 80 consisting of songs and/or music videos appearing on a particular episode of the television program, with such database being searchable on an episode-by-episode basis, (3) displaying the songs and/or music videos associated with such songs used in a particular episode in response to a user request, and (4) providing an Internet link whereby any particular song, music video, content containing such song, music video, album, video presentation or other product or service in which any particular song appears, can be purchased through a "buy it now" link 82 and 84 or a direct link 86 to a vendor of such song, album, music video, or other product or service. Ancillary revenues are thereby generated through referral arrangements between the database provider and the vendor of the product or service.

In further aspects also illustrated in FIGS. 10-14, ancillary revenue streams are created by (1) producing episodes of a television program which utilize music 72, which can consist of entire songs 74, partial songs 76, or clips, from various artists 78; (2) creating and populating a database consisting of concert dates and associated locations by the various artists who perform such songs; (3) displaying the concert dates and associated locations of artists whose songs are used in a particular episode in response to a user request; and (4) providing an Internet link, whereby tickets to such concerts can be purchased through a "buy it now" link or a direct link to a vendor of such concert tickets. In an additional embodiment of the invention, the concert dates of artists who perform songs in particular episodes can be displayed based on proximity to the user, either in response to user supplied location information, such as a zip code, or by collecting such information from a user at the time a user subscribes to, or joins, the website 10 (see FIG. 1), and then associating such information with the user each time the user visits and/or signs into the website. Ancillary revenues are thereby generated through referral arrangements between the database provider and the vendor of the songs or albums provided.

In further aspects illustrated by FIGS. 15-20, ancillary revenue streams are created by (1) selecting or designing an article 68, such as an article of clothing, or prop for use by an actor or actress on a televised program that is not commercially available for sale to the public prior to the broadcast of such televised program; (2) producing an episode of a television program or motion picture with the actor or actress wearing or using the article or prop; (3) enabling the creation of duplicates of the article or prop such that the duplicates are available for sale contemporaneously with the initial broadcast of the television program; and (4) enabling the direct purchase of duplicates of the article or prop used by the actor on the televised program, either through phone or Internet ordering, during or immediately following broadcast of the televised program. Example articles can include, for example, the following: jewelry 88, accessories, watches, hats, purses, sunglasses, or other items that are specifically selected or designed for use in the televised program. Additionally, the present invention embodies the related media content, services, or products discussed above being available only to viewers, users, and potential customers that subscribe to a membership.

It should be appreciated that the present invention should not be limited to the specific embodiments described above. The foregoing detailed description is provided for purposes of illustration, and it is not intended to be exhaustive or to limit the invention to the particular embodiments disclosed. The embodiments can provide different capabilities and benefits, depending on the configuration used to implement the key features. Accordingly, the scope of the invention is defined only by the following claims.

The invention claimed is:

1. An apparatus comprising a processor coupled to a memory and to a network interface, the memory holding instructions that when executed by a processor cause a computer to perform the operations of:

serving, by the computer to at least one client over a computer network, a webpage including information identifying episodes of an audio-video program, wherein at least one of the episodes has not yet been published;

serving, by the computer to the at least one client over the computer network, in at least one of the webpage or in a second webpage, a link enabling access to or purchase of at least one of an ancillary product or ancillary content that is related to and distinct from the at least one of the episodes that has not yet been published;

publishing, by the computer to the at least one client over the computer network, information describing the at least one of an ancillary product or ancillary content, restricted to identified members prior to an earliest scheduled air date of the at least one of the episodes that has not yet been published; and enabling exclusive access for ones of the members, by the computer via the computer network, to the at least one of an ancillary product or ancillary content prior to the earliest scheduled air date.

2. The apparatus of claim 1, wherein the memory holds further instructions for enabling the exclusive access for ones of the members to the at least one of an ancillary product or ancillary content comprising at least one of a photo, textual information, audio-video content or audio-only content.

3. The apparatus of claim 1, wherein the memory holds further instructions for including in the webpage or in the second webpage a description of how the ancillary product relates to the at least one of the episodes that has not yet been published.

4. The apparatus of claim 1, wherein the memory holds further instructions for obtaining the ancillary product from the group consisting of: a behind the scenes video clip, or a video journal for a character appearing in the audio-video program.

5. The apparatus of claim 1, wherein the memory holds further instructions for enabling the exclusive access for ones of the members to the at least one of an ancillary product or ancillary content comprising at least one of a ring tone or digital wallpaper.

6. The apparatus of claim 1, wherein the memory holds further instructions for enabling the exclusive access for ones of the members to the at least one of an ancillary product or ancillary content comprising electronic messaging access for members to stars of the audio-video program.

7. The apparatus of claim 1, wherein the memory holds further instructions for enabling the exclusive access for ones of the members to the at least one of an ancillary product or ancillary content comprising at least one of: an option to purchase limited-edition members-only merchandise, an option to purchase a backstage pass to a production set, or a members-only discount for merchandise sold at an online store.

8. The apparatus of claim 1, wherein the memory holds further instructions for enabling the exclusive access for ones of the members to the at least one of an ancillary product or ancillary content comprising at least one of: at least a portion of a music recording from an episode of the audio-video program, access to a database including information identifying a music recording selected from the group consisting of an entire song and a portion of the song included in the at least one of the episodes that has not yet been published, an option to purchase the at least a portion of the music recording, or an option to purchase a ticket for admission to a concert to be performed by an artist that performed a song included in the music recording.

9. The apparatus of claim 1, wherein the memory holds further instructions for requiring payment of a fee by the ones of the members prior to the enabling exclusive access.

10. A method, comprising:
serving, by the computer to at least one client over a computer network, a webpage including information identifying episodes of an audio-video program, wherein at least one of the episodes has not yet been published;
serving, by the computer to the at least one client over the computer network, in at least one of the webpage or in a second webpage, a link enabling access to or purchase of at least one of an ancillary product or ancillary content that is related to and distinct from the at least one of the episodes that has not yet been published;
publishing, by the computer to the at least one client over the computer network, information describing the at least one of an ancillary product or ancillary content, restricted to identified members prior to an earliest scheduled air date of the at least one of the episodes that has not yet been published; and
enabling exclusive access for ones of the members, by the computer via the computer network, to the at least one of an ancillary product or ancillary content prior to the earliest scheduled air date.

11. The method of claim 10, further comprising enabling the exclusive access for ones of the members to the at least one of an ancillary product or ancillary content comprising at least one of a photo, textual information, audio-video content or audio-only content.

12. The method of claim 10, further comprising including in the webpage or in the second webpage a description of how the ancillary product relates to the at least one of the episodes that has not yet been published.

13. The method of claim 10, further comprising obtaining the ancillary product from the group consisting of: a behind the scenes video clip, or a video journal for a character appearing in the audio-video program.

14. The method of claim 10, further comprising enabling the exclusive access for ones of the members to the at least one of an ancillary product or ancillary content comprising at least one of a ring tone or digital wallpaper.

15. The method of claim 10, further comprising enabling the exclusive access for ones of the members to the at least one of an ancillary product or ancillary content comprising electronic messaging access for members to stars of the audio-video program.

16. The method of claim 10, further comprising enabling the exclusive access for ones of the members to the at least one of an ancillary product or ancillary content comprising at least one of: an option to purchase limited-edition members-only merchandise, an option to purchase a backstage pass to a production set, or a members-only discount for merchandise sold at an online store.

17. The method of claim 10, further comprising enabling the exclusive access for ones of the members to the at least one of an ancillary product or ancillary content comprising at least one of: at least a portion of a music recording from an episode of the audio-video program, access to a database including information identifying a music recording selected from the group consisting of an entire song and a portion of the song included in the at least one of the episodes that has not yet been published, an option to purchase the at least a portion of the music recording, or an option to purchase a ticket for admission to a concert to be performed by an artist that performed a song included in the music recording.

18. The method of claim 17, wherein the information identifying a music recording comprises a name of the song, a name of an artist that performs the song, a name of the episode of the broadcast program that includes the song, and at least one songlist for the episode.

19. The method of claim 10, further comprising requiring payment of a fee by the ones of the members prior to the enabling exclusive access.

20. An apparatus, comprising:
means for serving a webpage including information identifying episodes of an audio-video program, wherein at least one of the episodes has not yet been published;
means for serving, in at least one of the webpage or in a second webpage, a link enabling access to or purchase of at least one of an ancillary product or ancillary content that is related to and distinct from the at least one of the episodes that has not yet been published;
means for publishing information describing the at least one of an ancillary product or ancillary content, restricted to identified members prior to an earliest scheduled air date of the at least one of the episodes that has not yet been published; and
means for enabling exclusive access for ones of the members to the at least one of an ancillary product or ancillary content prior to the earliest scheduled air date.

* * * * *